United States Patent
Ho et al.

(10) Patent No.: US 10,684,859 B2
(45) Date of Patent: Jun. 16, 2020

(54) PROVIDING MEMORY DEPENDENCE PREDICTION IN BLOCK-ATOMIC DATAFLOW ARCHITECTURES

(71) Applicant: QUALCOMM Incorporated, San Diego, CA (US)

(72) Inventors: Chen-Han Ho, Raleigh, NC (US); Gregory Michael Wright, Chapel Hill, NC (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 15/269,254

(22) Filed: Sep. 19, 2016

(65) Prior Publication Data

US 2018/0081686 A1 Mar. 22, 2018

(51) Int. Cl.
*G06F 9/30* (2018.01)
*G06F 9/38* (2018.01)

(52) U.S. Cl.
CPC ........ *G06F 9/3834* (2013.01); *G06F 9/30043* (2013.01); *G06F 9/3838* (2013.01)

(58) Field of Classification Search
CPC ..... G06F 9/00–3897; G06F 15/00–825; G06F 9/3834; G06F 15/82; G06F 15/825; G06F 9/3836; G06F 9/3838; G06F 9/30043
See application file for complete search history.

(56) References Cited

U.S. PATENT DOCUMENTS 5,781,752 A * 7/1998 Moshovos ............ G06F 9/3834
712/216
5,987,595 A * 11/1999 Yoaz ....................... G06F 9/383
712/216
6,108,770 A 8/2000 Chrysos et al.
(Continued)

FOREIGN PATENT DOCUMENTS

EP 2660716 A1 11/2013

OTHER PUBLICATIONS

International Preliminary Report on Patentability for PCT/US2017/047946, dated Aug. 14, 2018, 36 pages.
(Continued)

*Primary Examiner* — Keith E Vicary
(74) *Attorney, Agent, or Firm* — Withrow & Terranova, PLLC

(57) ABSTRACT

Providing memory dependence prediction in block-atomic dataflow architectures is provided, in one aspect, la a memory dependence prediction circuit. The memory dependence prediction circuit comprises a predictor table configured to store multiple predictor table entries, each comprising a store instruction identifier, a block reach set, and a load set. Using this data, the memory dependence prediction circuit determines, upon a fetch of an instruction block by an execution pipeline, whether the instruction block contains store instructions that reach dependent load instructions. If so, the store instructions are marked as having dependent load instructions to wake. In some aspects, the memory
(Continued)

dependence prediction circuit is configured to determine whether the instruction block contains dependent load instructions reached by store instructions. If so, the memory dependence prediction circuit delays execution of the dependent load instructions.

23 Claims, 17 Drawing Sheets

(56) References Cited

U.S. PATENT DOCUMENTS

| | | | | |
|---|---|---|---|---|
| 6,212,622 | B1* | 4/2001 | Witt | G06F 9/3814 |
| | | | | 712/2 |
| 6,463,523 | B1* | 10/2002 | Kessler | G06F 9/3814 |
| | | | | 712/202 |
| 6,651,161 | B1* | 11/2003 | Keller | G06F 9/3834 |
| | | | | 712/216 |
| 9,128,725 | B2* | 9/2015 | Meier | G06F 9/3834 |
| 9,244,827 | B2 | 1/2016 | Kim et al. | |
| 9,262,171 | B2 | 2/2016 | Golla et al. | |
| 2003/0065909 | A1* | 4/2003 | Jourdan | G06F 9/3834 |
| | | | | 712/216 |
| 2005/0251668 | A1* | 11/2005 | Chaudhry | G06F 9/383 |
| | | | | 712/235 |
| 2010/0205384 | A1* | 8/2010 | Beaumont-Smith | |
| | | | | G06F 12/0862 |
| | | | | 711/154 |
| 2010/0325395 | A1 | 12/2010 | Burger et al. | |
| 2013/0298127 | A1* | 11/2013 | Meier | G06F 9/3834 |
| | | | | 718/100 |
| 2014/0281408 | A1* | 9/2014 | Zeng | G06F 9/30043 |
| | | | | 712/216 |
| 2014/0282601 | A1 | 9/2014 | Abdallah | |
| 2014/0380023 | A1 | 12/2014 | Smaus et al. | |
| 2015/0006452 | A1 | 1/2015 | Kim et al. | |
| 2017/0083324 | A1* | 3/2017 | Burger | G06F 9/3004 |
| 2017/0083327 | A1* | 3/2017 | Burger | G06F 9/3004 |
| 2017/0083331 | A1* | 3/2017 | Burger | G06F 9/3004 |
| 2017/0371660 | A1* | 12/2017 | Smith | G06F 9/30043 |
| 2018/0032344 | A1* | 2/2018 | Smith | G06F 9/3855 |
| 2018/0081806 | A1* | 3/2018 | Kothinti Naresh | |
| | | | | G06F 12/0815 |

OTHER PUBLICATIONS

Chrysos, George Z. et al., "Memory Dependence Prediction using Store Sets," ACM SIGARCH Computer Architecture News, vol. 26, No. 3, 1998, IEEE Computer Society, 12 pages.

Moshovos, Andreas et al., "Dynamic Speculation and Synchronization of Data Dependences," ACM SIGARCH omputer Architecture News, vol. 25, No. 2, 1997, ACM, pp. 181-193.

Sankaralingam, Karthikeyan et al., "Distributed Microarchitectural Protocols in the TRIPS Prototype Processor," 39th Annual IEEE/ACM International Symposium on Microarchitecture (MICRO'06), 2006, IEEE Computer Society, 12 pages.

Sethumadhavan, Simha et al., "Design and Implementation of the TRIPS Primary Memory System," International conference on Computer Design (ICCD 2006), 2006, IEEE, 7 pages.

International Search Report and Written Opinion for PCT/US2017/047946, dated Nov. 16, 2017, 23 pages.

* cited by examiner

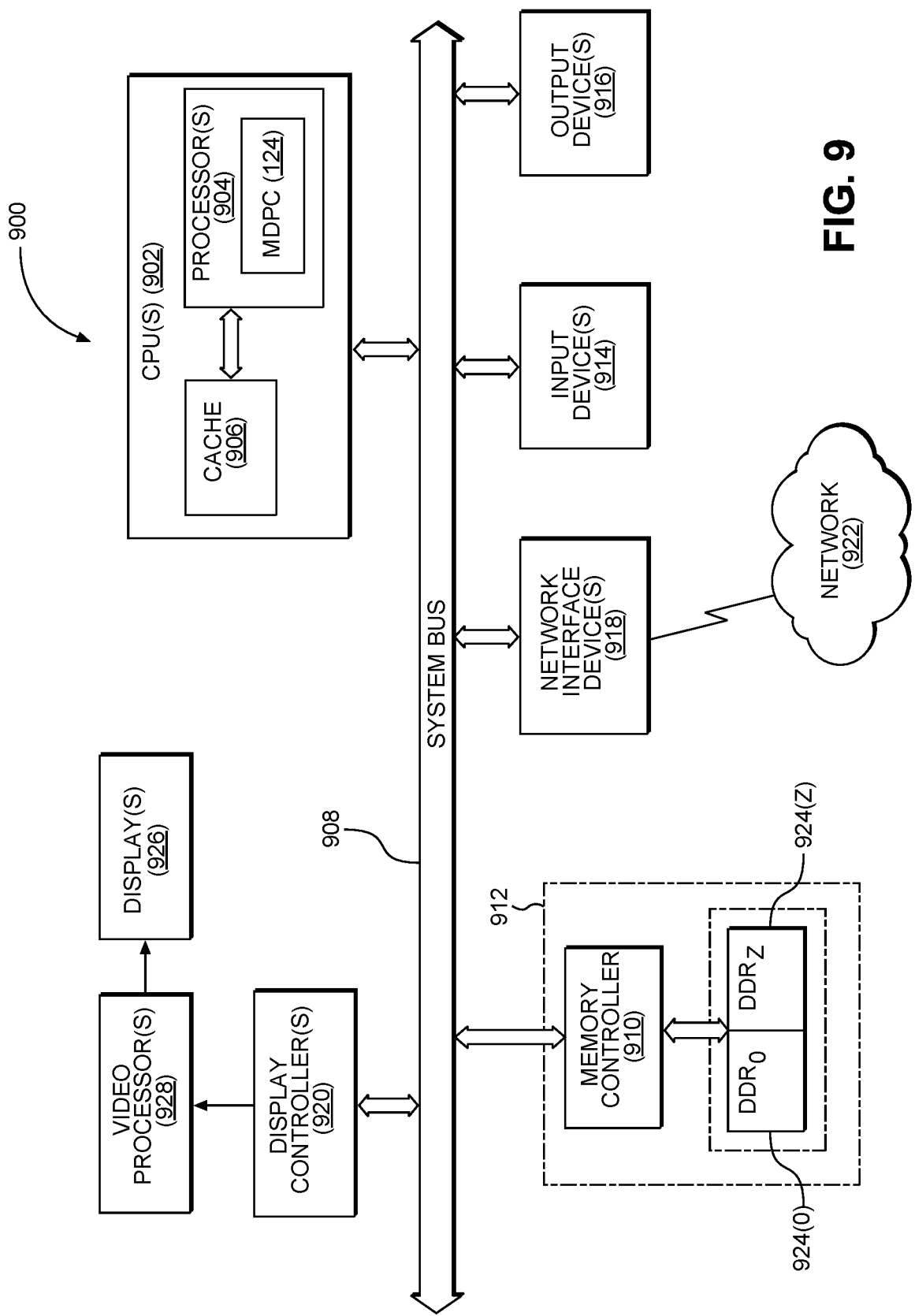

PROVIDING MEMORY DEPENDENCE PREDICTION IN BLOCK-ATOMIC DATAFLOW ARCHITECTURES

BACKGROUND

I. Field of the Disclosure

The technology of the disclosure relates generally to memory dependence prediction, and, in particular, to memory dependence prediction in block-atomic dataflow architectures.

II. Background

A "block-atomic dataflow architecture," as used herein, is a computer architecture in which computer programs are subdivided into dataflow instruction blocks, each of which comprises multiple dataflow instructions that are fetched, executed, and committed atomically as a group. The dataflow instructions are executed in an order determined by the availability of input operands (i.e., a dataflow instruction is allowed to execute as soon as all of its input operands are available, regardless of the program order of the dataflow instruction). Load instructions and store instructions within a dataflow instruction block are buffered until execution of the dataflow instruction block is complete, at which time all of the load instructions and store instructions are committed together.

To improve system performance, an out-of-order processor (OoP) based on a block-atomic dataflow architecture may employ memory dependence prediction techniques to anticipate a dependency between a load instruction and a store instruction at instruction execution time. Successful memory dependence prediction may enable the OoP to ensure that the store instruction and its dependent load instruction execute in the correct order, thus avoiding memory dependence violations. Memory dependence prediction may also allow the OoP to speculatively execute other load instructions and store instructions out of order to prevent processor stalls that may negatively impact performance.

However, the block-atomic dataflow architecture presents unique challenges to efficient memory dependence prediction. Because execution order of dataflow instructions in a dataflow instruction block is not guaranteed to correspond to program order, the OoP may have to base its memory dependence prediction on block-level information rather than on finer-grained instruction-level information. Moreover, the OoP may be unable to efficiently determine dynamically whether the load instructions on which memory dependence predictions are based will be executed or fetched. Even searching for dependent load instructions and corresponding store instructions based on program order may be difficult because there may be no strict ordering of the dataflow instructions in the dataflow instruction block even when fetching the dataflow instructions. Similarly, the OoP may not be able to rely on the program order of a dependent load instruction and its corresponding store instruction when "waking" the dependent load instruction after execution of the store instruction.

SUMMARY OF THE DISCLOSURE

Aspects disclosed in the detailed description include providing memory dependence prediction in block-atomic dataflow architectures. In one aspect, a memory dependence prediction circuit is provided. The memory dependence prediction circuit is communicatively coupled to an execution pipeline of a processor device that is based on a block-atomic dataflow architecture. The memory dependence prediction circuit provides a predictor table for storing a plurality of predictor table entries, which are used to track occurrences of memory dependence violations. Each predictor table entry includes a store instruction identifier that corresponds to an instance of a store instruction, along with a block reach set and a load set for the store instruction. The block reach set contains block identifiers that correspond to instruction blocks containing dependent load instructions that have a memory dependence on the instance of the store instruction, while the load set contains load instruction identifiers corresponding to the dependent load instructions for the store instruction. When an instruction block is fetched, the memory dependence prediction circuit uses the store instruction identifiers of the predictor table to identify any store instructions within the instruction block that reach one or more dependent load instructions. The memory dependence prediction circuit marks such store instructions as having dependent load instructions to wake. The memory dependence prediction circuit also determines, based on the block reach sets and the load sets stored in the predictor table, whether the instruction block contains dependent load instructions reached by corresponding store instructions. If so, execution of the one or more dependent load instructions is delayed when the instruction block is executed. The one or more dependent load instructions are later "woken" for execution upon execution of the corresponding store instructions. In some aspects, a load/store unit of the processor device is configured to coordinate with the memory dependence prediction circuit by providing a marker table and a delay buffer for use in marking load and store instructions and delaying execution of dependent load instructions.

In another aspect, a memory dependence prediction circuit is provided. The memory dependence prediction circuit comprises a predictor table configured to store a plurality of predictor table entries. Each predictor table entry of the plurality of predictor table entries comprises a store instruction identifier corresponding to an instance of a store instruction. Each predictor table entry further comprises a block reach set comprising at least one block identifier corresponding to at least one instruction block each containing one or more dependent load instructions having a memory dependence on the instance of the store instruction. Each predictor table entry also comprises a load set comprising one or more load instruction identifiers corresponding to the one or more dependent load instructions. The memory dependence prediction circuit is configured to, upon a fetch of an instruction block by an execution pipeline, determine, based on one or more store instruction identifiers of the plurality of predictor table entries of the predictor table, whether the instruction block contains one or more store instructions that reach one or more dependent load instructions. The memory dependence prediction circuit is further configured to, responsive to determining that the instruction block contains one or more store instructions that reach one or more dependent load instructions, mark the one or more store instructions as having one or more dependent load instructions to wake.

In another aspect, a method for providing memory dependence prediction is provided. The method comprises detecting, by a memory dependence prediction circuit, a fetch of an instruction block by an execution pipeline of the processor device. The method further comprises determining, based on one or more store instruction identifiers of a plurality of predictor table entries of a predictor table, whether the instruction block contains one or more store instructions that reach one or more dependent load instructions. The method also comprises, responsive to determining that the instruction block contains one or more store instructions that reach one or more dependent load instructions, marking the one or more store instructions as having one or more dependent load instructions to wake.

In another aspect, a memory dependence prediction circuit is provided. The memory dependence prediction circuit comprises a means for detecting a fetch of an instruction block by an execution pipeline of a processor device. The memory dependence prediction circuit further comprises a means for determining, based on one or more store instruction identifiers of a plurality of predictor table entries of a predictor table, whether the instruction block contains one or more store instructions that reach one or more dependent load instructions. The memory dependence prediction circuit also comprises a means for marking the one or more store instructions as having dependent load instructions to wake, responsive to determining that the instruction block contains one or more store instructions that reach one or more dependent load instructions.

BRIEF DESCRIPTION OF THE FIGURES

FIG. 9 is a block diagram of an exemplary processor-based system that can include the block-atomic dataflow processor core of FIG. 1.

DETAILED DESCRIPTION

Figure 1:
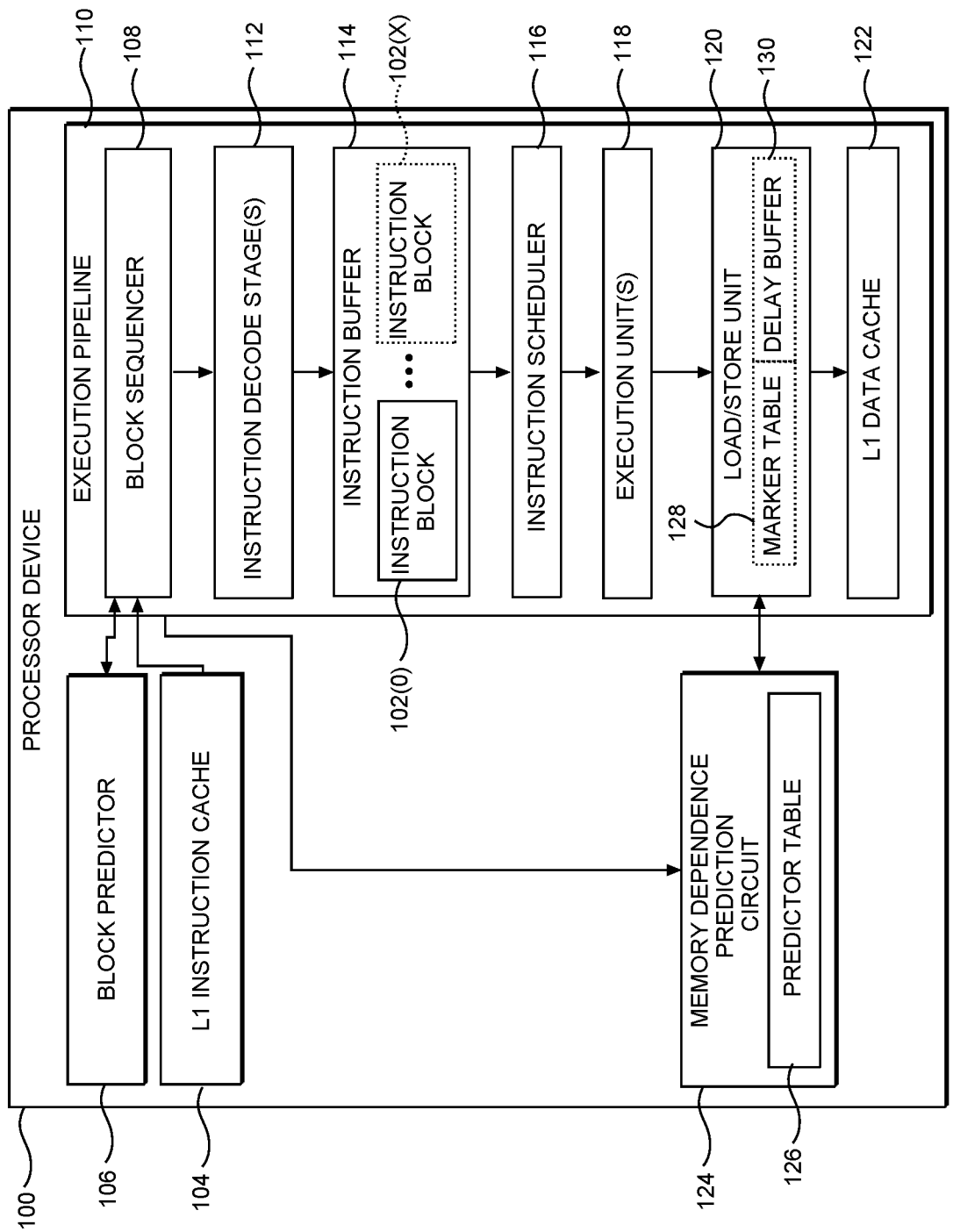
FIG. 1 is a block diagram of an exemplary processor device that implements a block-atomic dataflow architecture and includes a memory dependence prediction circuit for providing memory dependence prediction.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing memory dependence prediction in block-atomic dataflow architectures. Before discussing a memory dependence prediction circuit for performing memory dependence prediction, exemplary elements and operation of a processor device based on a block-atomic dataflow architecture are described. In this regard, FIG. 1 illustrates an exemplary processor device 100 that is based on a block-atomic dataflow architecture, and that is configured to execute a sequence of instruction blocks, such as instruction blocks 102(0)-102(X). In some aspects, the processor device 100 may be one of multiple block-atomic dataflow processor cores, each executing separate sequences of instruction blocks 102(0)-102(X) and/or coordinating to execute a single sequence of instruction blocks 102(0)-102(X). The processor device 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

In exemplary operation, a Level 1 (L1) instruction cache 104 of the processor device 100 may receive instruction blocks (e.g., instruction blocks 102(0)-102(X)) for execution. It is to be understood that, at any given time, the processor device 100 may be processing more or fewer instruction blocks than the instruction blocks 102(0)-102(X) illustrated in FIG. 1. A block predictor 106 determines a predicted execution path of the instruction blocks 102(0)-102(X). In some aspects, the block predictor 106 may predict an execution path in a manner analogous to a branch predictor of a conventional out-of-order processor (OoP). A block sequencer 108 within an execution pipeline 110 orders the instruction blocks 102(0)-102(X), and forwards the instruction blocks 102(0)-102(X) to one of one or more instruction decode stages 112 for decoding.

After decoding, the instruction blocks 102(0)-102(X) are held in an instruction buffer 114 pending execution. An instruction scheduler 116 distributes instructions (not shown) of the active instruction blocks 102(0)-102(X) to one of one or more execution units 118 of the processor device 100. As non-limiting examples, the one or more execution units 118 may comprise an arithmetic logic unit (ALU) and/or a floating-point unit. The one or more execution units 118 may provide results of instruction execution to a load/store unit 120, which in turn may store the execution results in an L1 data cache 122.

The instruction blocks 102(0)-102(X) may include store instructions (not shown) for performing memory write operations and/or load instructions (not shown) for performing memory read operations. Because the processor device 100 may execute instructions out of order, it is desirable for the processor device 100 to employ memory dependence prediction techniques to speculatively determine dependencies between load instructions and store instructions at instruction execution time. However, the out-of-order nature of instruction execution by the processor device 100 presents challenges to efficient memory dependence prediction. For instance, the processor device 100 may have to base its memory dependence prediction on block-level information rather than finer-grained instruction-level information, and further may be unable to dynamically determine whether the load instructions used to make memory dependence predictions will be executed or fetched. In addition, locating dependent load instructions and corresponding store instructions based on program order may be difficult because there may be no strict ordering of the instructions in an instruction block even when fetching dataflow instructions.

In this regard, a memory dependence prediction circuit 124 of FIG. 1 is provided to enable memory dependence prediction for the processor device 100. The memory dependence prediction circuit 124 makes use of a predictor table 126 to maintain a history of memory dependence violations that are detected by the processor device 100. Subsequently, as each instruction block 102(0)-102(X) is fetched, the memory dependence prediction circuit 124 uses the data stored in the predictor table 126 to identify any store instructions within each instruction block 102(0)-102(X) that reach one or more dependent load instructions. The store instructions are then marked as having dependent load instructions to wake. The memory dependence prediction circuit 124 also determines, based on the predictor table 126, whether each instruction block 102(0)-102(X) contains dependent load instructions reached by corresponding store instructions. If so, execution of the one or more dependent load instructions is delayed when the instruction block 102(0)-102(X) is executed. The one or more dependent load instructions are later "woken" for execution upon execution of the corresponding store instruction. Some aspects may provide that the load/store unit 120 of the processor device 100 is configured to coordinate with the memory dependence prediction circuit 124 by providing a marker table 128 and a delay buffer 130 for use in marking load and store instructions and delaying execution of dependent load instructions, respectively.

Figure 2:
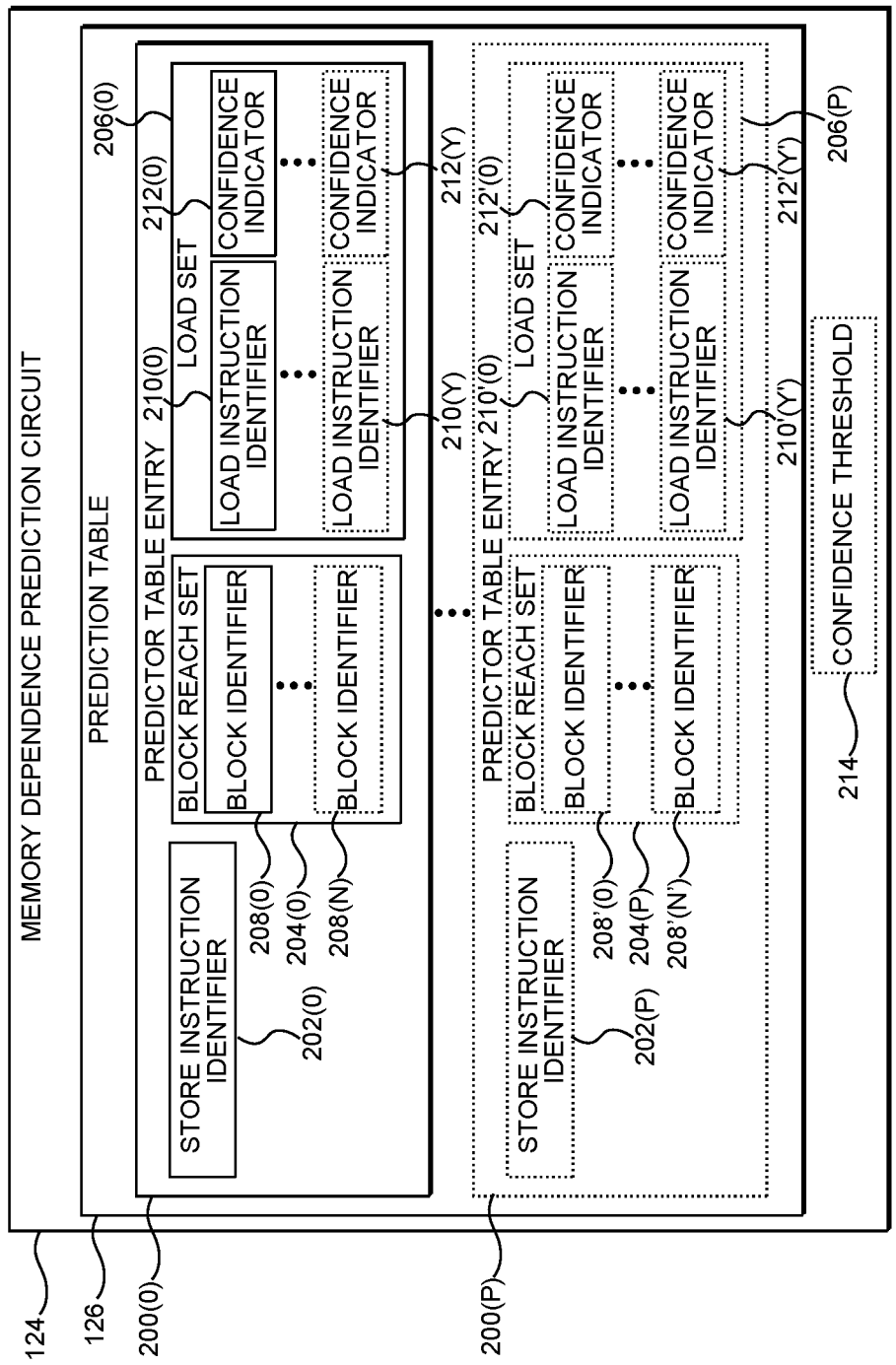
FIG. 2 is a block diagram illustrating exemplary contents of a predictor table of the memory dependence prediction circuit of FIG. 1.

To explain exemplary configurations and operations of the memory dependence prediction circuit 124 of FIG. 1 in greater detail, FIGS. 2, 3A-3D, and 4A-4D are provided. FIG. 2 illustrates exemplary contents of the predictor table 126 of the memory dependence prediction circuit 124 of FIG. 1. Exemplary operations and communication flows involved in populating the predictor table 126 are discussed with respect to FIGS. 3A-3D, while FIGS. 4A-4D illustrate exemplary operations and communications flows for using the marker table 128 to mark load and store instructions, and for using the delay buffer 130 to delay execution of dependent load instructions.

As seen in FIG. 2, the predictor table 126 of the memory dependence prediction circuit 124 of FIG. 1 is configured to store one or more predictor table entries 200(0)-200(P). Each of the predictor table entries 200(0)-200(P) is generated and updated in response to a detected memory dependence violation, and corresponds to an instance of a store instruction (not shown) in one of the instruction blocks 102(0)-102(X) of FIG. 1. Accordingly, the predictor table entries 200(0)-200(P) each include a store instruction identifier 202(0)-202(P) identifying a store instruction that corresponds to the detected memory dependence violation. In some aspects, each of the store instruction identifiers 202(0)-202(P) may comprise identification data such as a program counter (PC) for the store instruction, as a non-limiting example. Some aspects, such as those in which an instruction is not associated with a PC, may provide a store instruction identifier 202(0)-202(P) that includes a PC of the instruction block 102(0)-102(X) containing the store instruction, along with an instruction identifier encoded within the store instruction that indicates a logical order of the store instruction within the instruction block 102(0)-102(X). Alternately, each of the store instruction identifiers 202(0)-202(P) according to some aspects may include the PC of the instruction block 102(0)-102(X) and an offset indicating a location of the store instruction relative to a start of the instruction block 102(0)-102(X). In some aspects, the store instruction identifiers 202(0)-202(P) each may include a memory address of the corresponding store instruction.

Each of the predictor table entries 200(0)-200(P) also includes a block reach set 204(0)-204(P) and a load set 206(0)-206(P). The block reach sets 204(0)-204(P) contain at least one block identifier 208(0)-208(N), 208'(0)-208'(N) identifying the instruction blocks 102(0)-102(X) that contain a load instruction that is dependent on the store instruction. As described in greater detail below, the block reach sets 204(0)-204(P) may be used by the memory dependence prediction circuit 124 to determine the "reach" of the store instruction. If multiple instances of a given store instruction (e.g., a store instruction that is executed multiple times) are detected, the corresponding block reach sets 204(0)-204(P) are updated each time the instruction block 102(0)-102(X) containing the store instruction is fetched to include the block identifiers 208(0)-208(N), 208'(0)-208'(N') identifying the different instruction blocks 102(0)-102(X) having load instructions dependent on the store instruction.

The load sets 206(0)-206(P) contain one or more load instruction identifiers 210(0)-210(Y), 210'(0)-210'(Y') that identify the dependent load instructions of the store instruction. Some aspects may provide that each of the load instruction identifiers 210(0)-210(Y), 210'(0)-210'(Y) may comprise identification data such as a PC for the load instruction, as a non-limiting example. According to some aspects, each of the load instruction identifiers 210(0)-210(Y), 210'(0)-210'(Y') may include a PC of the instruction block 102(0)-102(X) containing the load instruction, along with an instruction identifier encoded within the load instruction that indicates a logical order of the load instruction within the instruction block 102(0)-102(X). Some aspects may provide that the load instruction identifiers 210(0)-210(Y), 210'(0)-210'(Y') each may include the PC of the instruction block 102(0)-102(X) and an offset indicating a location of the load instruction relative to a start of the instruction block 102(0)-102(X). In some aspects, each of the load instruction identifiers 210(0)-210(Y), 210'(0)-210'(Y') may include a memory address of the corresponding load instruction.

In some aspects, the load sets 206(0)-206(P) may also include confidence indicators 212(0)-212(Y), 212'(0)-212'(Y') corresponding to the load instruction identifiers 210(0)-210(Y), 210'(0)-210'(Y'). The confidence indicators 212(0)-212(Y), 212'(0)-212'(Y') may be used by the memory dependence prediction circuit 124 to ascertain a level of certainty with respect to the dependence between a given load instruction and a store instruction. As a non-limiting example, the memory dependence prediction circuit 124 may base a memory dependence prediction on a particular load instruction identifier 210(0)-210(Y), 210'(0)-210'(Y') only if the corresponding confidence indicator 212(0)-212(Y), 212'(0)-212'(Y') exceeds a specified confidence threshold 214.

As noted above, the predictor table entries 200(0)-200(P) of the predictor table 126 are generated and updated in response to memory dependence violations detected by the memory dependence prediction circuit 124. To illustrate operations for populating the predictor table 126, FIGS. 3A-3D are provided. In FIGS. 3A-3D, three (3) instruction blocks 102(0)-102(X) ("Block X," "Block Y," and "Block Z," respectively) are shown. Each of the instruction blocks 102(0)-102(X) includes a corresponding block header 300(0)-300(X), which may contain identification and control data, as non-limiting examples, for the instruction block 102(0)-102(X). The instruction block 102(0) includes a store instruction 302 ("STORE") and its associated identifier ("ID") 304. Similarly, the instruction blocks 102(1) and 102(X) include load instructions 306(0) ("LOAD A") and 306(Y) ("LOAD B"), respectively, with corresponding IDs 308(0) and 308(1). It is to be understood that, in the examples of FIGS. 3A-3D, the load instructions 306(0) and 306(Y) are dependent on the store instruction 302. For purposes of illustration, FIGS. 3A-3D also show the memory dependence prediction circuit 124 and the predictor table 126 of FIG. 1.

Figure 3A:
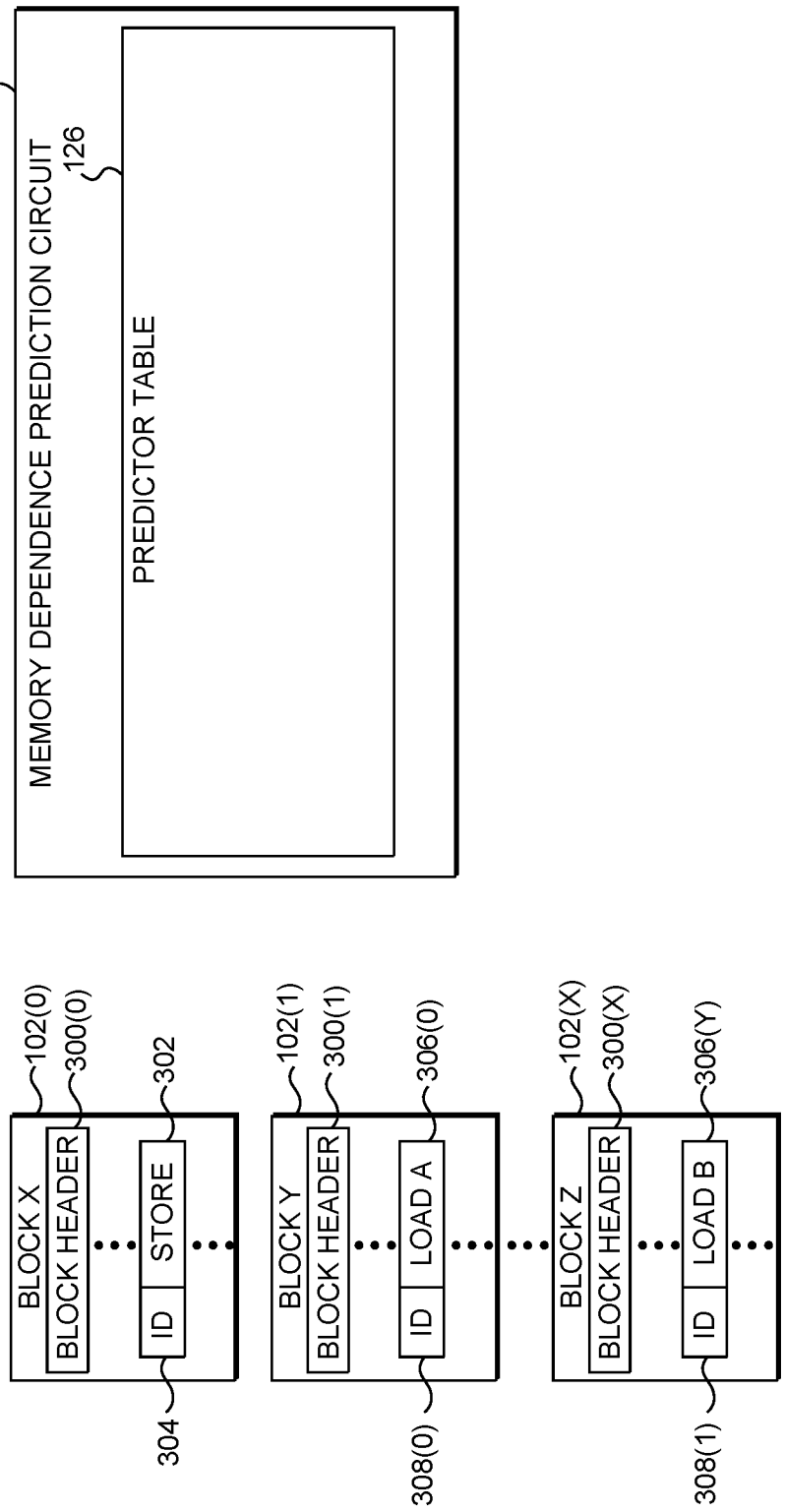
FIGS. 3A-3D are diagrams illustrating exemplary communications flows for the memory dependence prediction circuit of FIG. 1 for populating a predictor table.

In FIG. 3A, assume that an attempt to execute the dependent load instruction 306(0) prior to execution of the store instruction 302 has resulted in a memory dependence violation (not shown), which has been detected by the memory dependence prediction circuit 124. In response, the memory dependence prediction circuit 124 accesses the predictor table 126 to determine whether a predictor table entry, such as the predictor table entries 200(0)-200(P) of FIG. 2, contains a store instruction identifier (e.g., the store instruction identifier 202(0) of FIG. 2) corresponding to the store instruction 302 on which the dependent load instruction 306(0) depends.

Figure 3B:
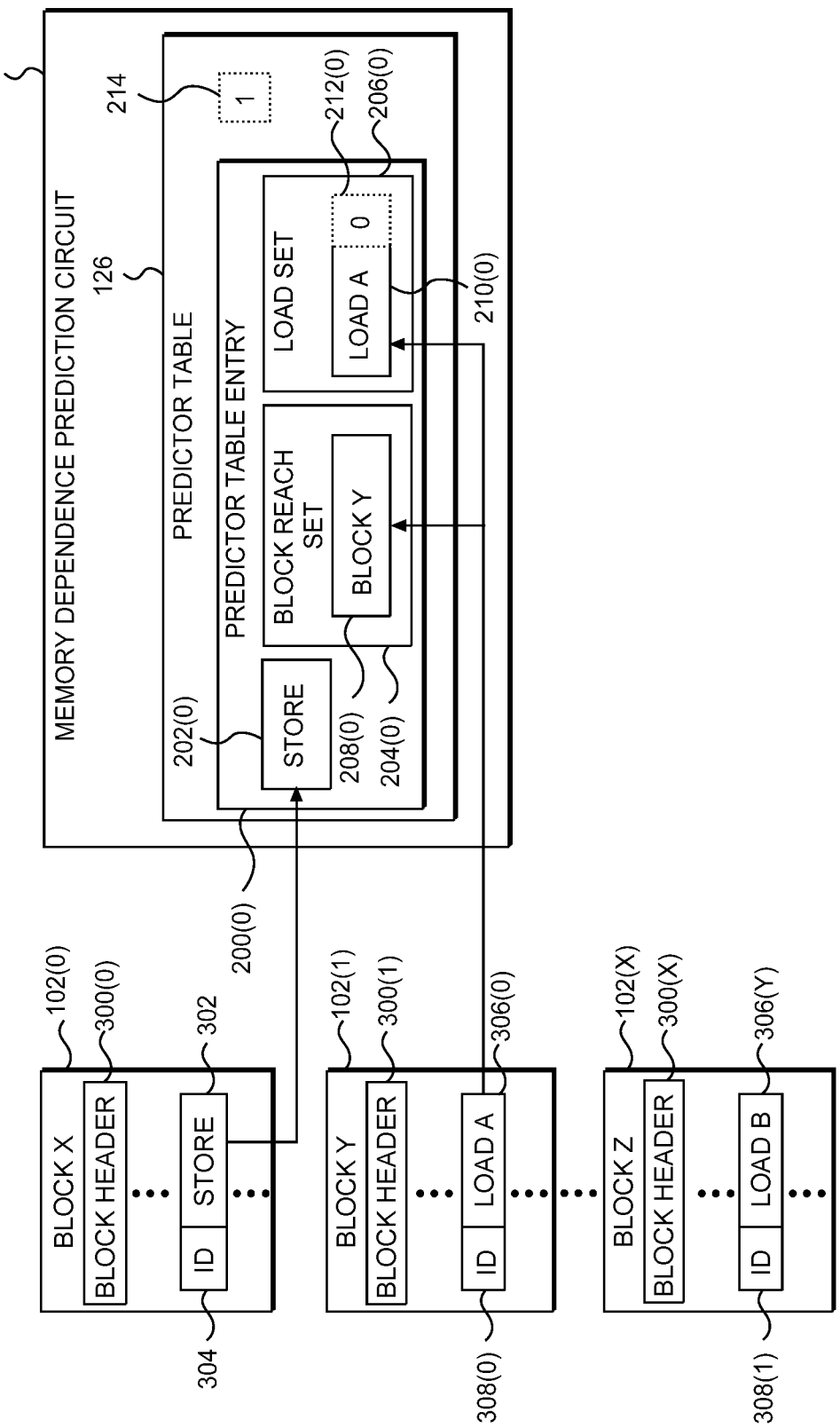

In the example of FIG. 3A, the predictor table 126 is empty. Thus, as seen in FIG. 3B, the memory dependence prediction circuit 124 generates the predictor table entry 200(0). A store instruction identifier 202(0) corresponding to the store instruction 302 is added to the predictor table entry 200(0). In some aspects, the store instruction identifier 202(0) may comprise data identifying the store instruction 302 such as the ID 304, and/or data identifying the instruction block 102(0) containing the store instruction 302. A block reach set 204(0) and a load set 206(0) are also added to the predictor table entry 200(0), with the block reach set 204(0) containing a block identifier 208(0) ("BLOCK Y") corresponding to the instruction block 1024(1) and the load set 206(0) containing a load instruction identifier 210(0) ("LOAD A") corresponding to the dependent load instruction 306(0). In addition, in some aspects, a confidence indicator 212(0) (e.g., having a value of zero (0)) associated with the dependent load instruction 306(0) is added to the load set 206(0). The confidence indicator 212(0) may be compared to a confidence threshold 214 (in this example, the value one (1)) by the memory dependence prediction circuit 124 to determine whether to provide a memory dependence prediction.

Figure 3C:
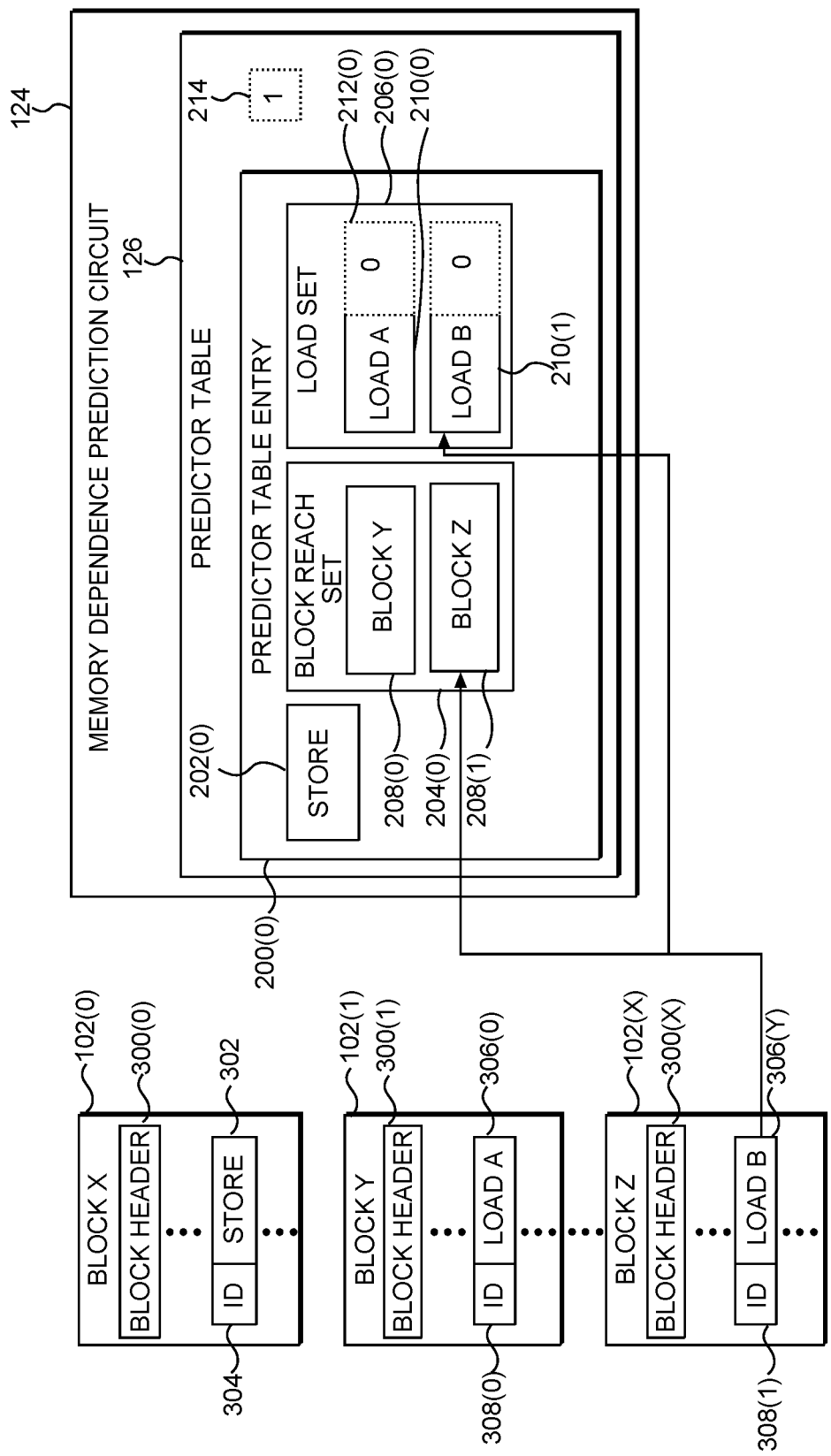
Figure 3D:
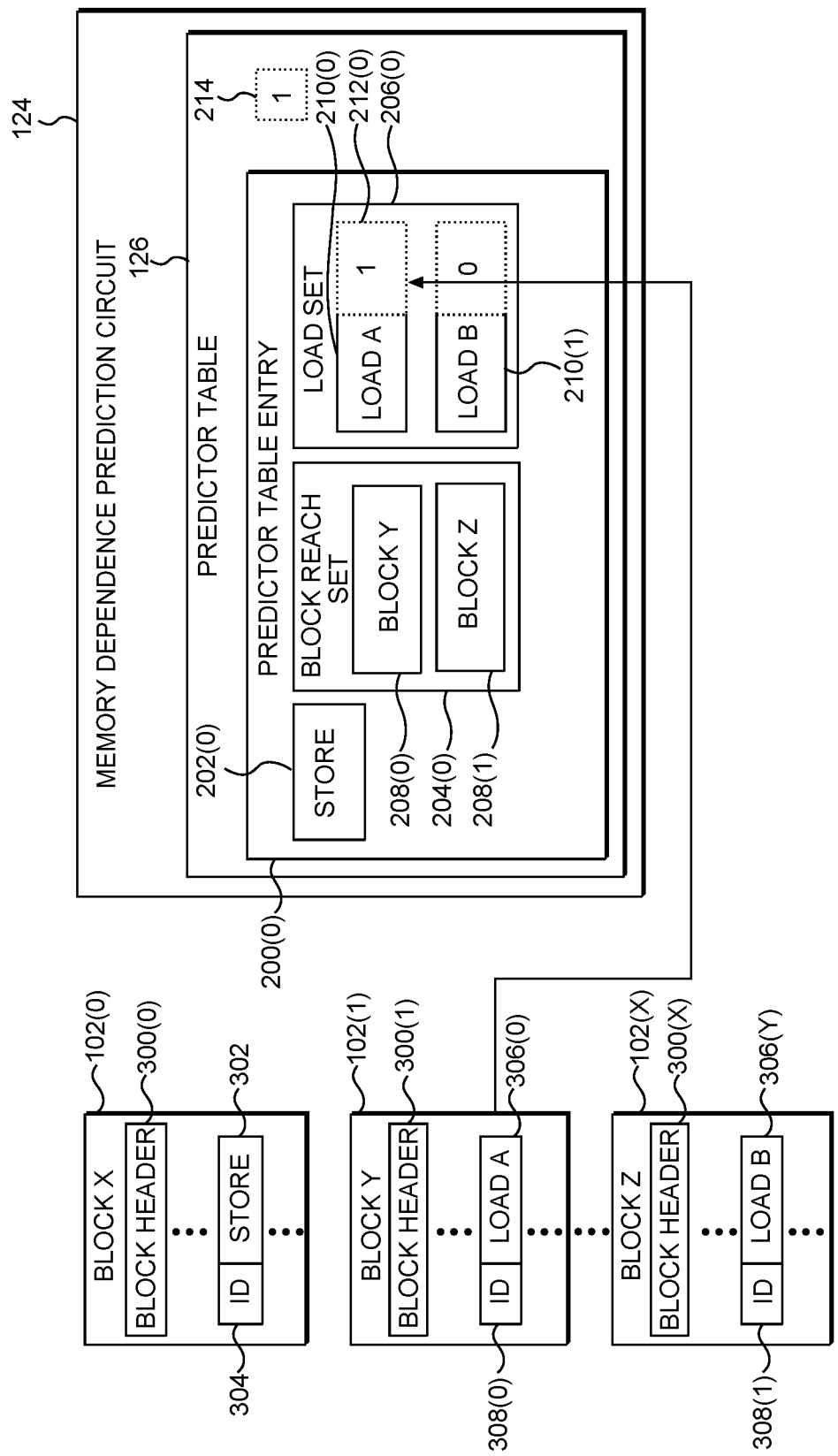

Referring now to FIG. 3C, assume further that another memory dependence violation, caused by an attempt to execute the dependent load instruction 306(Y) prior to execution of the store instruction 302, occurs and is detected by the memory dependence prediction circuit 124. The memory dependence prediction circuit 124 again accesses the predictor table 126 to determine whether the store instruction identifier 202(0) corresponding to the store instruction 302 on which the dependent load instruction 306(Y) depends is present. In this case, the predictor table entry 200(0) contains the store instruction identifier 202(0) for the store instruction 302. The memory dependence prediction circuit 124 then examines the load set 206(0) to determine whether a load instruction identifier 210(0)-210(Y) corresponding to the dependent load instruction 306(Y) is present. Upon determining that the load set 206(0), as shown in FIG. 3B, does not contain a load instruction identifier 210(0)-210(Y) for the dependent load instruction 306(Y), the memory dependence prediction circuit 124 adds a load instruction identifier 210(1) for the dependent load instruction 306(Y) to the load set 206(0).

The memory dependence prediction circuit 124 also consults the block reach set 204(0) for the predictor table entry 200(0) to determine whether a block identifier 208(0)-208(N) for the instruction block 102(X) is present. Because there is no block identifier 208(0)-208(N) for the instruction block 102(X) in the block reach set 204(0), the memory dependence prediction circuit 124 adds a block identifier 208(1) ("BLOCK Z") for the instruction block 102(X) to the block reach set 204(0).

In the example of FIG. 3D, assume again that a memory dependence violation has occurred as a result of another attempt to execute the dependent load instruction 306(0) before the store instruction 302 has executed. In this case, the memory dependence prediction circuit 124 determines that the predictor table entry 200(0) contains both a store instruction identifier 202(0) corresponding to the store instruction 302 as well as a load instruction identifier 210(0) corresponding to the dependent load instruction 306(0). Accordingly, the memory dependence prediction circuit 124 may increment the value of the confidence indicator 212(0) to indicate a greater confidence in the possibility of future memory dependence violations.

FIGS. 4A-4D illustrate how the predictor table 126 may be used in some aspects in conjunction with the marker table 128 and the delay buffer 130 to delay execution of dependent load instructions in order to prevent memory dependence violations. FIGS. 4A-4D show the instruction blocks 102(0)-102(X), the store instruction 302, the dependent load instructions 306(0) and 306(Y), the memory dependence prediction circuit 124, and the predictor table 126 as illustrated in FIGS. 3A-3D. FIGS. 4A-4D also show the predictor table entry 200(0) as it was populated in FIG. 3D, and illustrates the load/store unit 120 and the execution pipeline 110 of FIG. 1. As seen in FIGS. 4A-4D, the load/store unit 120 provides the marker table 128 and the delay buffer 130, the functionality of which is discussed in greater detail below.

Figure 4A:
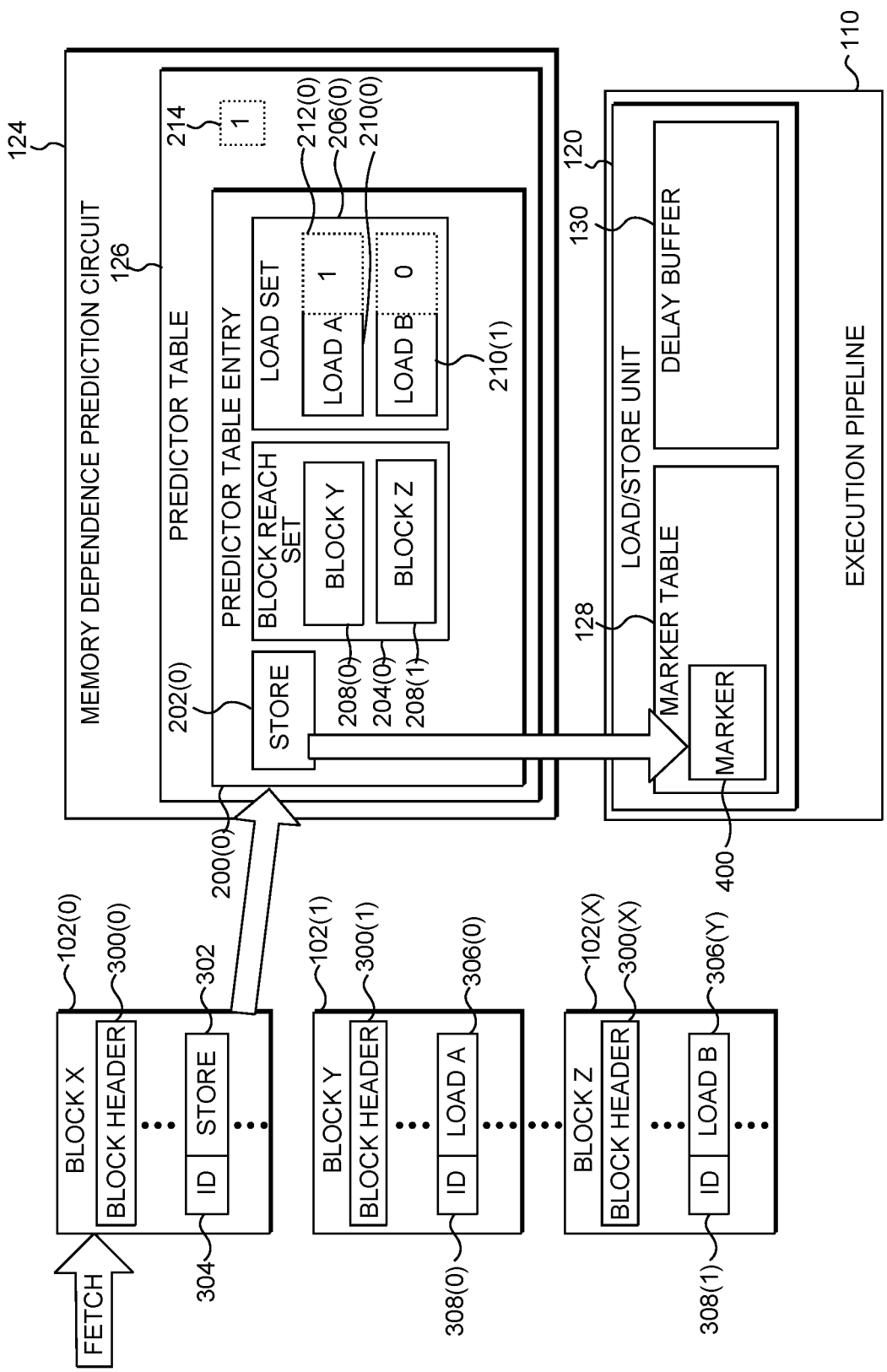
FIGS. 4A-4D are diagrams illustrating exemplary communications flows for the memory dependence prediction circuit and a load/store unit of FIG. 1 for predicting memory dependence.

FIG. 4A illustrates exemplary operations and communications flows that take place upon the fetching of the instruction block 102(0) in some aspects. When the instruction block 102(0) is fetched, the memory dependence prediction circuit 124 identifies all store instructions that belong to the instruction block 102(0) and that reach one or more load instructions. In the example of FIG. 4A, the memory dependence prediction circuit 124 identifies the store instruction 302 in the instruction block 102(0). The memory dependence prediction circuit 124 then locates the store instruction identifier 202(0) corresponding to the store instruction 302 in the predictor table entry 200(0). The memory dependence prediction circuit 124 is thus able to conclude that the store instruction 302 reaches one or more dependent load instructions (i.e., dependent load instructions 306(0) and 306(Y)). The memory dependence prediction circuit 124 marks the store instruction 302 as having dependent load instructions 306(0), 306(Y) to wake, by causing a marker 400 for the store instruction 302 to be generated and stored in the marker table 128 of the load/store unit 120.

Figure 4B:
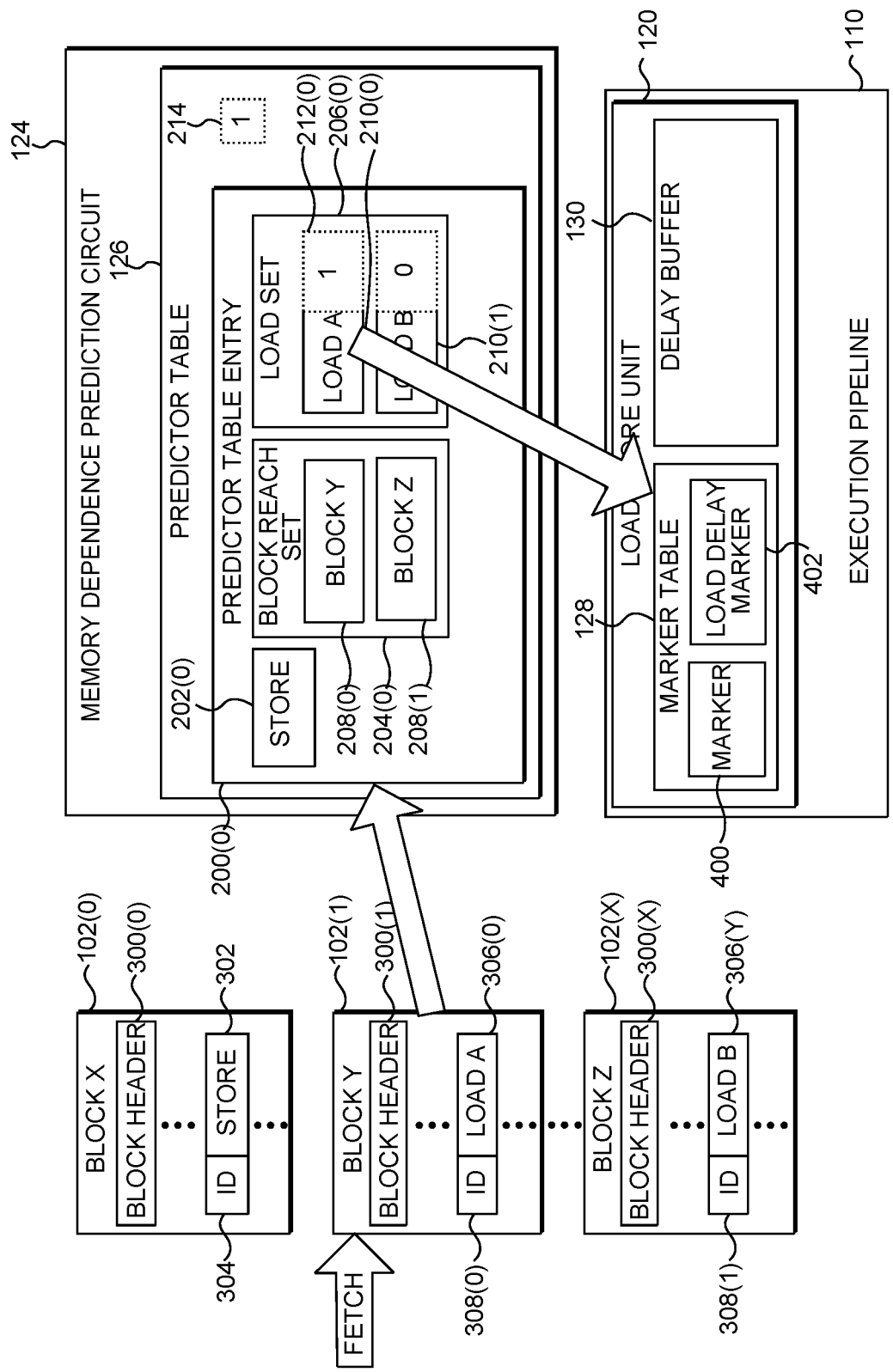

When the instruction block 102(1) is fetched, the operations and communications flows illustrated in FIG. 4B take place. When the memory dependence prediction circuit 124 detects the fetch of the instruction block 102(1), the memory dependence prediction circuit 124 examines the predictor table entry 200(0), and identifies the dependent load instruction 306(0) as belonging to the instruction block 102(1) and being reached by the store instruction 302. The memory dependence prediction circuit 124 generates a load delay marker 402 for the dependent load instruction 306(0), indicating that execution of the load instruction 306(0) is to be delayed until after execution of the corresponding store instruction 302. In the example of FIG. 4B, the load delay marker 402 is also stored in the marker table 128.

Figure 4C:
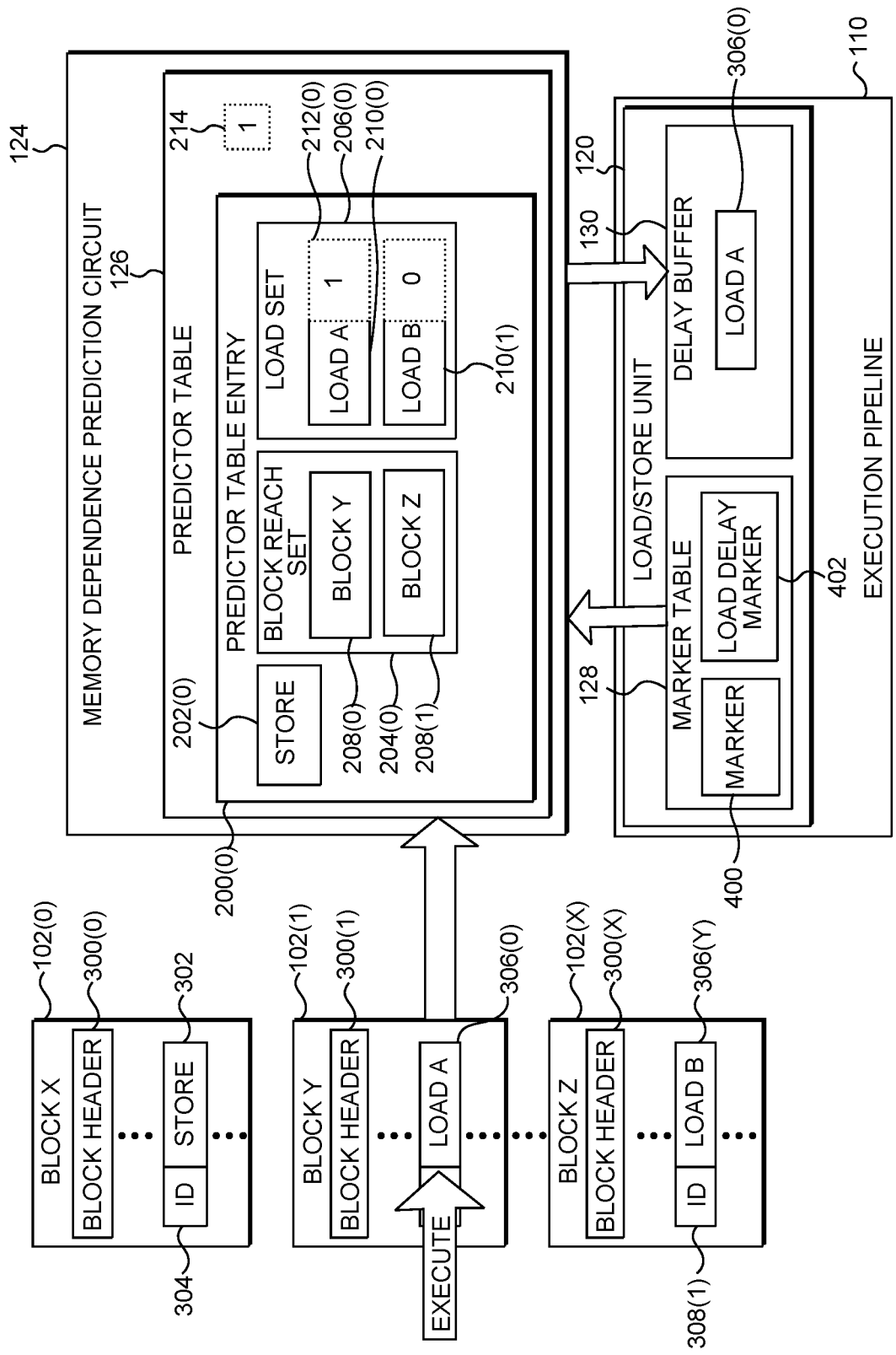

In FIG. 4C, the dependent load instruction 306(0) has been selected for execution. At this point, the memory dependence prediction circuit 124 determines, based on the predictor table entry 200(0) and/or the marker table 128, that execution of the dependent load instruction 306(0) is to be delayed. Accordingly, the memory dependence prediction circuit 124 in this example causes the load/store unit 120 to transfer the load instruction 306(0) to the delay buffer 130, where it is held until the store instruction 302 has executed.

Figure 4D:
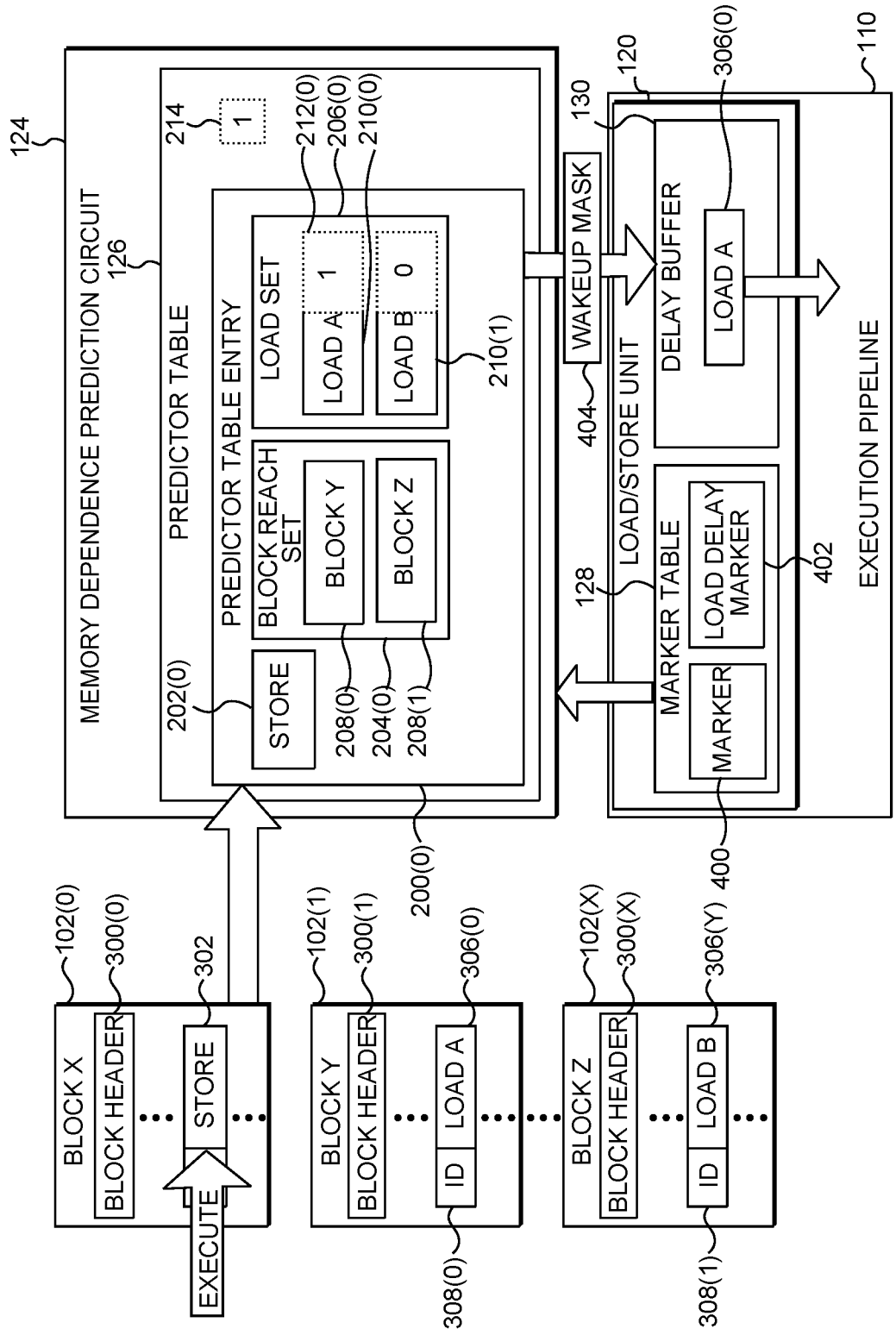

Finally, as seen in FIG. 4D, when the store instruction 302 is selected for execution, the memory dependence prediction circuit 124 checks the marker table 128 of the load/store unit 120, and, based on the marker 400, identifies the store instruction 302 as having the dependent load instruction 306(0) to wake. Thus, the memory dependence prediction circuit 124 consults the predictor table 126 and generates a wakeup mask 404 identifying all dependent load instructions 306(0), 306(Y) to wake after execution of the store instruction 302. The wakeup mask 404 is sent to the load/store unit 120, which, after the store instruction 302 has completed execution, transfers the dependent load instruction 306(0) to the execution pipeline 110 to be executed.

Figure 5A:
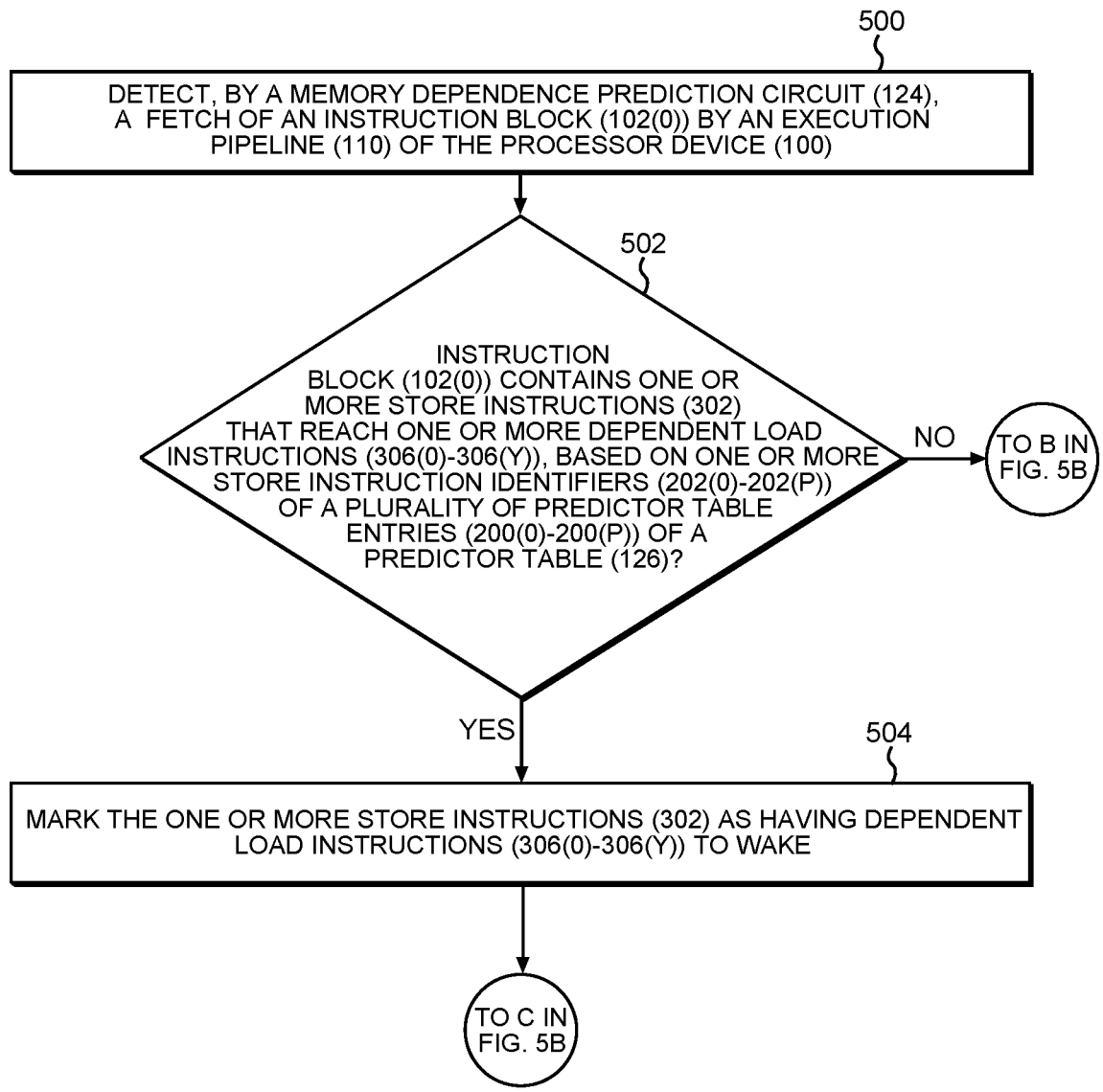
FIGS. 5A and 5B are flowcharts illustrating an exemplary process for providing memory dependence prediction in block-atomic dataflow architectures by marking store instructions having dependent load instructions, and delaying execution of the dependent load instructions upon execution of an instruction block.
Figure 5B:
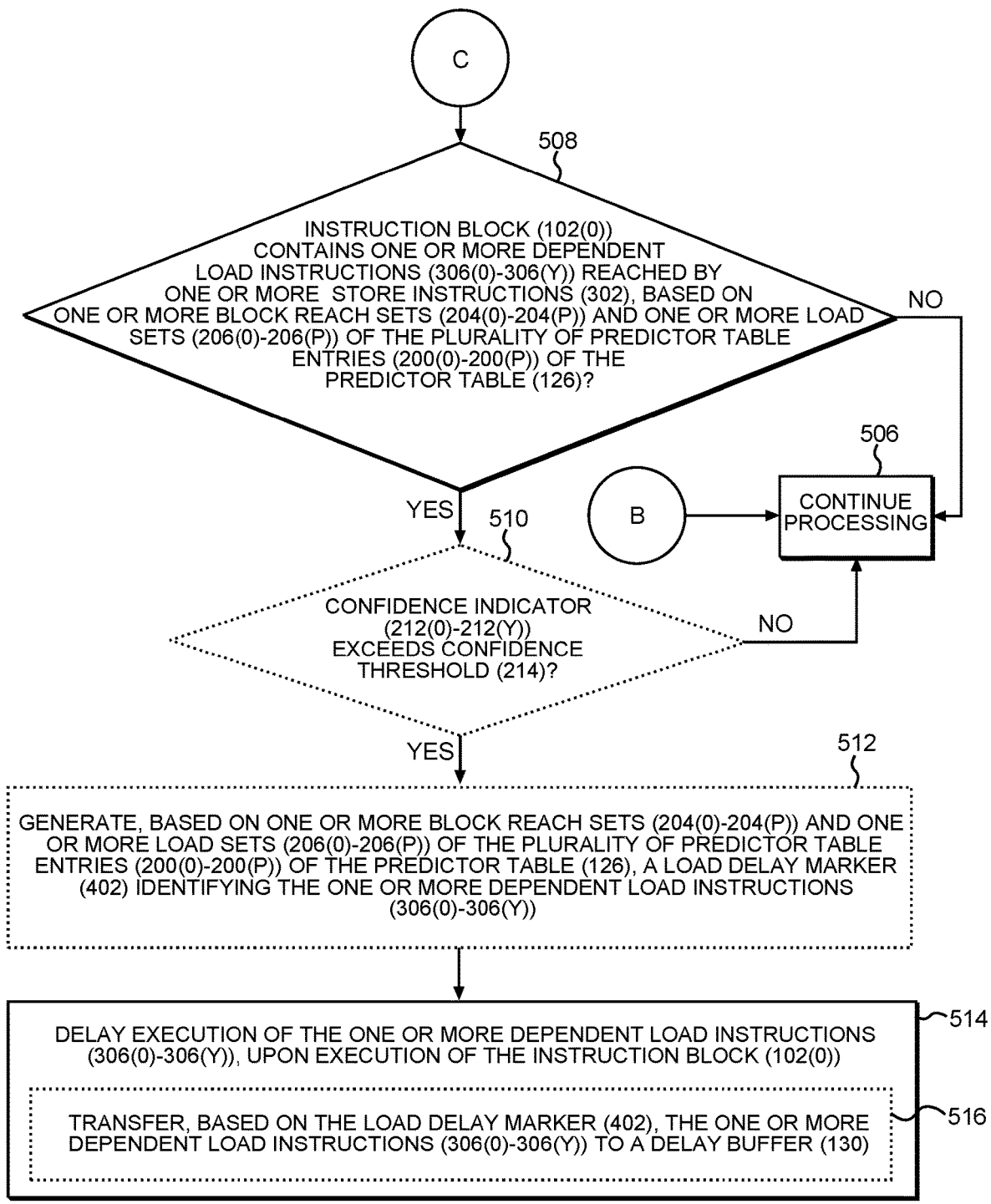

FIGS. 5A and 5B are flowcharts illustrating exemplary operations of the memory dependence prediction circuit 124 for providing memory dependence prediction in block-atomic dataflow architectures. For the sake of clarity, elements of FIGS. 1, 2, 3A-3D, and 4A-4D are referenced in describing FIGS. 5A and 5B. In FIG. 5A, operations begin with the memory dependence prediction circuit 124 detecting a fetch of an instruction block 102(0) by an execution pipeline 110 of the processor device 100 (block 500). In this regard, the memory dependence prediction circuit 124 may be referred to herein as "a means for detecting a fetch of an instruction block by an execution pipeline of a processor device." The memory dependence prediction circuit 124 next determines whether the instruction block 102(0) contains one or more store instructions 302 that reach one or more dependent load instructions 306(0)-306(Y), based on one or more store instruction identifiers 202(0)-202(P) of the plurality of predictor table entries 200(0)-200(P) of the predictor table 126 (block 502). Accordingly, the memory dependence prediction circuit 124 may be referred to herein as "a means for determining, based on one or more store instruction identifiers of a plurality of predictor table entries of a predictor table, whether the instruction block contains one or more store instructions that reach one or more dependent load instructions."

If the memory dependence prediction circuit 124 determines at decision block 502 that the instruction block 102(0) does contain one or more store instructions 302 that reach one or more dependent load instructions 306(0)-306(Y), the memory dependence prediction circuit 124 marks the one or more store instructions 302 as having dependent load instructions 306(0)-306(Y) to wake (block 504). The memory dependence prediction circuit 124 may thus be referred to herein as "a means for marking the one or more store instructions as having dependent load instructions to wake, responsive to determining that the instruction block contains one or more store instructions that reach one or more dependent load instructions." Processing then resumes at block 508 of FIG. 5B. However, if the memory dependence prediction circuit 124 determines at decision block 502 that there are no store instructions 302 that reach one or more dependent load instructions 306(0)-306(Y), processing resumes at block 506 of FIG. 5B.

Referring now to FIG. 5B, the memory dependence prediction circuit 124 next determines whether the instruction block 102(0) contains one or more dependent load instructions 306(0)-306(Y) reached by one or more store instructions 302 (block 508). This determination is based on one or more block reach sets 204(0)-204(P) of the plurality of predictor table entries 200(0)-200(P) of the predictor table 126, each block reach set 204(0)-204(P) comprising at least one block identifier 208(0)-208(N) corresponding to at least one instruction block 102(0)-102(X) each containing one or more dependent load instructions 306(0)-306(Y). The determination is further based on one or more load sets 206(0)-206(P) of the plurality of predictor table entries 200(0)-200(P) of the predictor table 126, each load set 206(0)-206(P) comprising one or more load instruction identifiers 210(0)-210(Y) corresponding to one or more dependent load instructions 306(0)-306(Y). In this regard, the memory dependence prediction circuit 124 may be referred to herein as "a means for determining, based on one or more block reach sets, each comprising at least one block identifier corresponding to at least one instruction block each containing one or more dependent load instructions, and one or more load sets, each comprising one or more load instruction identifiers corresponding to one or more dependent load instructions, of the plurality of predictor table entries of the predictor table, whether the instruction block contains one or more dependent load instructions reached by one or more store instructions."

If the memory dependence prediction circuit 124 determines at decision block 508 that the instruction block 102(0) does not contain one or more dependent load instructions 306(0)-306(Y) reached by one or more store instructions 302, processing of the fetched instruction block 102(0) continues as usual (block 506). However, if the instruction block 102(0) does contain one or more dependent load instructions 306(0)-306(Y), the memory dependence prediction circuit 124 in some aspects may determine whether the confidence indicator 212(0)-212(Y) exceeds the confidence threshold 214 (block 510). If not, processing resumes at block 506. If the memory dependence prediction circuit 124 determines at decision block 510 that the confidence indicator 212(0)-212(Y) exceeds the confidence threshold 214, the memory dependence prediction circuit 124 according to some aspects may generate, based on one or more block reach sets 204(0)-204(P) and one or more load sets 206(0)-206(P) of the plurality of predictor table entries 200(0)-200(P) of the predictor table 126, a load delay marker 402 identifying the one or more dependent load instructions 306(0)-306(Y) (block 512). Accordingly, the memory dependence prediction circuit 124 may be referred to herein as "a means for generating, based on one or more block reach sets and one or more load sets of the plurality of predictor table entries of the predictor table, a load delay marker identifying the one or more dependent load instructions, responsive to determining that the instruction block contains one or more dependent load instructions reached by one or more store instructions."

The memory dependence prediction circuit 124 then delays execution of the one or more dependent load instructions 306(0)-306(Y) (block 514). The memory dependence prediction circuit 124 may thus be referred to herein as "a means for delaying execution of the one or more dependent load instructions upon execution of the instruction block, responsive to determining that the instruction block contains one or more dependent load instructions reached by one or more store instructions." In some aspects, operations of block 514 for delaying execution of the one or more dependent load instructions 306(0)-306(Y) may include the memory dependence prediction circuit 124 transferring, based on the load delay marker 402, the one or more dependent load instructions 306(0)-306(Y) to the delay buffer 130 (block 516). In this regard, the memory dependence prediction circuit 124 may be referred to herein as "a means for transferring, based on the load delay marker, the one or more dependent load instructions to a delay buffer."

Figure 6:
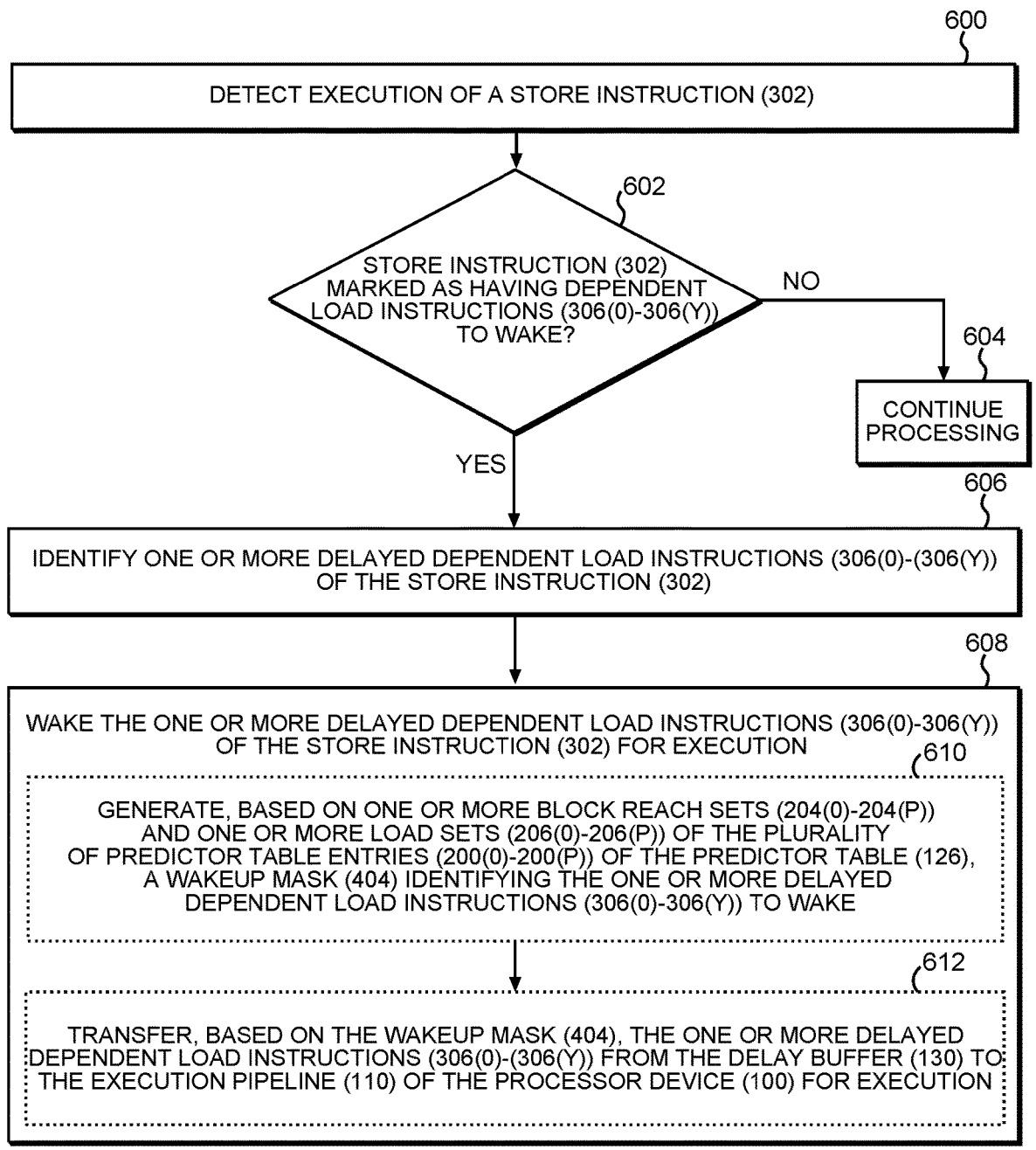
FIG. 6 is a flowchart illustrating an exemplary process for waking delayed dependent load instructions upon execution of a corresponding store instruction.

To illustrate an exemplary process for waking delayed dependent load instructions 306(0)-306(Y) upon execution of a corresponding store instruction 302, FIG. 6 is provided. In describing FIG. 6, elements of FIGS. 1, 2, 3A-3D, and 4A-4D are referenced for the sake of clarity. Operations in FIG. 6 begin with the memory dependence prediction circuit 124 detecting execution of a store instruction 302 (block 600). Accordingly, the memory dependence prediction circuit 124 may be referred to herein as "a means for detecting execution of a store instruction." The memory dependence prediction circuit 124 next determines whether the store instruction 302 is marked as having dependent load instructions 306(0)-306(Y) to wake (block 602). The memory dependence prediction circuit 124 may thus be referred to herein as "a means for determining whether the store instruction is marked as having dependent load instructions to wake." In some aspects, operations for determining whether the store instruction 302 is marked as having dependent load instructions 306(0)-306(Y) may include determining whether the marker table 128 of the load/store unit 120 contains a marker 400 corresponding to the store instruction 302 (not shown).

If the memory dependence prediction circuit 124 determines at decision block 602 that the store instruction 302 is not marked as having dependent load instructions 306(0)-306(Y) to wake, processing of the store instruction 302 continues as usual (block 604). However, if the memory dependence prediction circuit 124 determines at decision block 602 that the store instruction 302 is marked as having dependent load instructions 306(0)-306(Y) to wake, the memory dependence prediction circuit 124 next identifies one or more delayed dependent load instructions 306(0)-306(Y) of the store instruction 302 (block 606). In this regard, the memory dependence prediction circuit 124 may be referred to herein as "a means for identifying one or more delayed dependent load instructions of the store instruction, responsive to determining that the store instruction is marked as having one or more dependent load instructions to wake."

The memory dependence prediction circuit 124 then wakes the one or more delayed dependent load instructions 306(0)-306(Y) of the store instruction 302 for execution (block 608). Accordingly, the memory dependence prediction circuit 124 may be referred to herein as "a means for waking the one or more delayed dependent load instructions of the store instruction for execution." In some aspects, operations of block 608 for waking the one or more delayed dependent load instructions 306(0)-306(Y) may include the memory dependence prediction circuit 124 generating, based on one or more block reach sets 204(0)-204(P) and one or more load sets 206(0)-206(P) of the plurality of predictor table entries 200(0)-200(P) of the predictor table 126, a wakeup mask 404 identifying the one or more delayed dependent load instructions 306(0)-306(Y) to wake (block 610). The memory dependence prediction circuit 124 may thus be referred to herein as "a means for generating, based on one or more block reach sets and one or more load sets of the plurality of predictor table entries of the predictor table, a wakeup mask identifying the one or more delayed dependent load instructions to wake." The load/store unit 120 may then transfer, based on the wakeup mask 404, the one or more delayed dependent load instructions 306(0)-306(Y) from the delay buffer 130 to the execution pipeline 110 of the processor device 100 for execution (block 612). In this regard, the load/store unit 120 may be referred to herein as "a means for transferring, based on the wakeup mask, the one or more delayed dependent load instructions from the delay buffer to the execution pipeline of the processor device for execution."

Figure 7A:
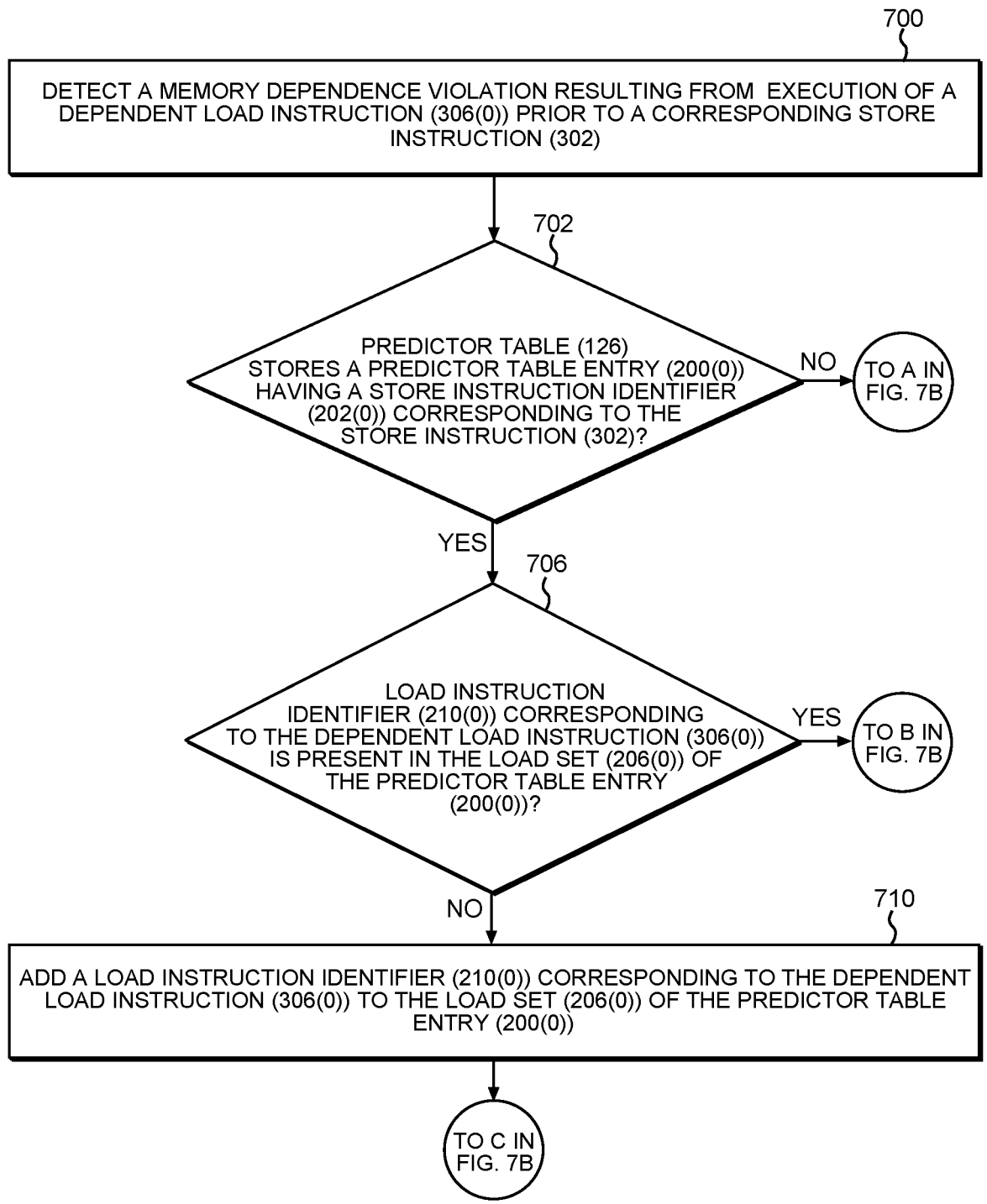
FIGS. 7A and 7B are flowcharts illustrating an exemplary process for populating a predictor table of the memory dependence prediction circuit of FIG. 1 in response to detection of a memory dependence violation.
Figure 7B:
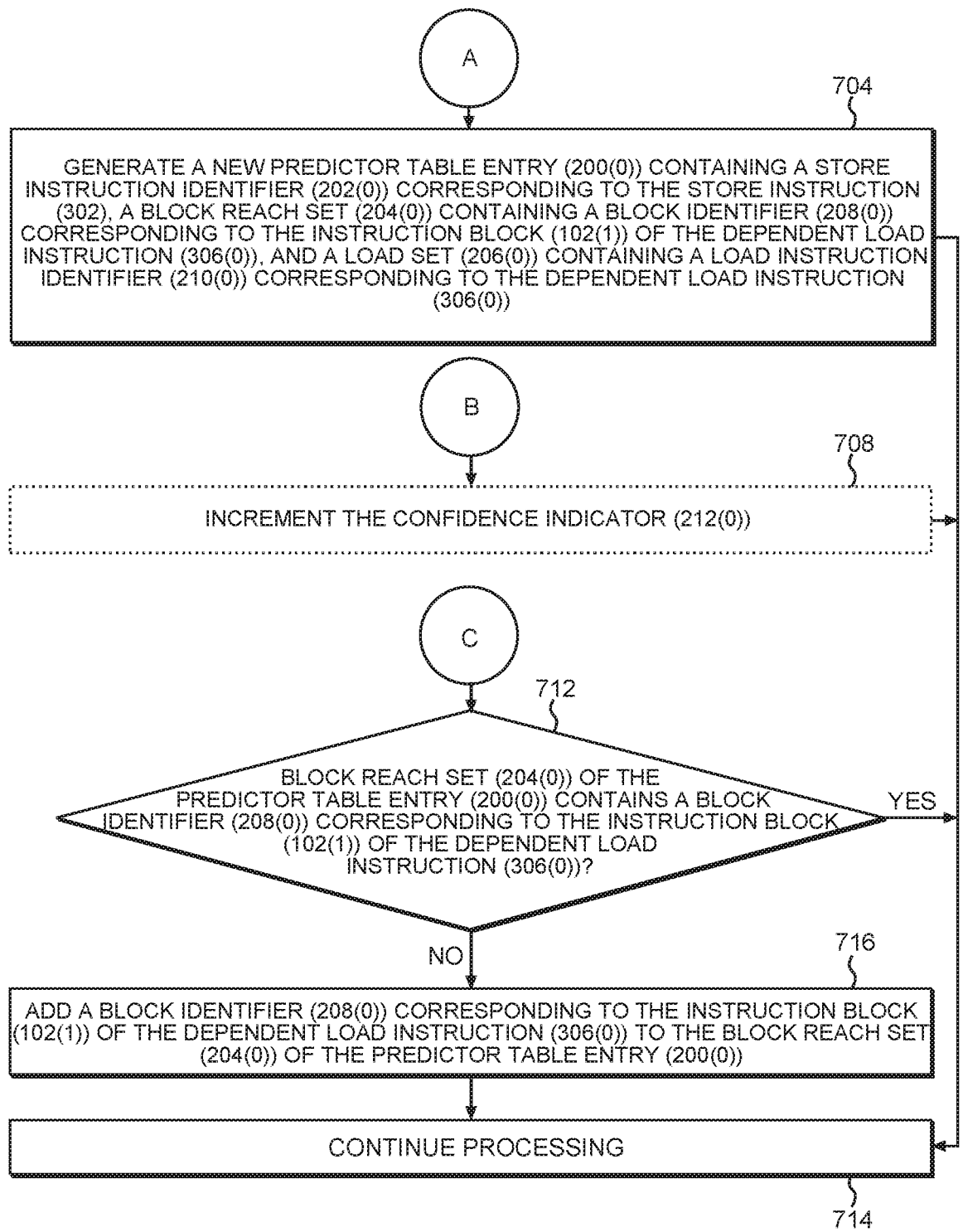

FIGS. 7A and 7B are provided to illustrate exemplary operations for populating the predictor table 126 of the memory dependence prediction circuit 124 of FIG. 1 in response to detection of a memory dependence violation. For the sake of clarity, elements of FIGS. 1, 2, 3A-3D, and 4A-4D are referenced in describing FIGS. 7A and 7B. In FIG. 7A, operations begin with the memory dependence prediction circuit 124 detecting a memory dependence violation resulting from execution of a dependent load instruction 306(0) prior to a corresponding store instruction 302 (block 700). Accordingly, the memory dependence prediction circuit 124 may be referred to herein as "a means for detecting a memory dependence violation resulting from execution of a dependent load instruction prior to a corresponding store instruction."

The memory dependence prediction circuit 124 next determines whether the predictor table 126 stores a predictor table entry 200(0) having a store instruction identifier 202(0) corresponding to the store instruction 302 (block 702). The memory dependence prediction circuit 124 may thus be referred to herein as "a means for determining whether the predictor table stores a predictor table entry having a store instruction identifier corresponding to the store instruction." If the predictor table 126 is determined at decision block 702 not to contain a predictor table entry 200(0) having the store instruction identifier 202(0), processing resumes at block 704 of FIG. 7B. Otherwise, the memory dependence prediction circuit 124 next determines whether a load instruction identifier 210(0) corresponding to the dependent load instruction 306(0) is present in the load set 206(0) of the predictor table entry 200(0) (block 706). In this regard, the memory dependence prediction circuit 124 may be referred to herein as "a means for determining, responsive to determining that the predictor table does store a predictor table entry, whether a load instruction identifier corresponding to the dependent load instruction is present in the load set of the predictor table entry." If a load instruction identifier 210(0) corresponding to the dependent load instruction 306(0) is determined to be present in the load set 206(0) of the predictor table entry 200(0) at decision block 706, processing resumes at block 708 of FIG. 7B.

If the memory dependence prediction circuit 124 determines at decision block 706 that the load set 206(0) of the predictor table entry 200(0) does not contain a load instruction identifier 210(0) corresponding to the dependent load instruction 306(0), the memory dependence prediction circuit 124 adds a load instruction identifier 210(0) corresponding to the dependent load instruction 306(0) to the load set 206(0) of the predictor table entry 200(0) (block 710). Accordingly, the memory dependence prediction circuit 124 may be referred to herein as "a means for adding a load instruction identifier corresponding to the dependent load instruction to the load set of the predictor table entry responsive to determining that a load instruction identifier corresponding to the dependent load instruction is present in the load set of the predictor table entry." Processing resumes at block 712 in FIG. 6B.

Referring now to FIG. 7B, if the memory dependence prediction circuit 124 determines at decision block 702 of FIG. 7A that the predictor table 126 does not contain a predictor table entry 200(0) having the store instruction identifier 202(0), the memory dependence prediction circuit 124 generates a new predictor table entry 200(0) containing a store instruction identifier 202(0) corresponding to the store instruction 302, a block reach set 204(0) containing a block identifier 208(0) corresponding to the instruction block 1024(1) of the dependent load instruction 306(0), and a load set 206(0) containing a load instruction identifier 210(0) corresponding to the dependent load instruction 306(0) (block 704). In this regard, the memory dependence prediction circuit 124 may be referred to herein as "a means for generating a new predictor table entry containing a store instruction identifier corresponding to the store instruction, a block reach set containing a block identifier corresponding to the instruction block of the dependent load instruction, and a load set containing a load instruction identifier corresponding to the dependent load instruction, responsive to determining that the predictor table does not store a predictor table entry." Processing of the detected memory dependence violation then continues as usual (block 714).

If the memory dependence prediction circuit 124 determines at decision block 706 of FIG. 7A that a load instruction identifier 210(0) corresponding to the dependent load instruction 306(0) is present in the load set 206(0) of the predictor table entry 200(0), the memory dependence prediction circuit 124 in some aspects may increment the confidence indicator 212(0) corresponding to the load instruction identifier 210(0) (block 708). The memory dependence prediction circuit 124 may thus be referred to herein as "a means for incrementing the confidence indicator, responsive to determining that a load instruction identifier corresponding to the dependent load instruction is present in the load set of the predictor table entry." Processing of the detected memory dependence violation then continues as usual (block 714).

If the memory dependence prediction circuit 124 determines at decision block 706 of FIG. 7A that the load set 206(0) of the predictor table entry 200(0) does not contain a load instruction identifier 210(0) corresponding to the dependent load instruction 306(0), after adding the load instruction identifier 210(0) to the load set 206(0), the memory dependence prediction circuit 124 determines whether the block reach set 204(0) of the predictor table entry 200(0) contains a block identifier 208(0) corresponding to the instruction block 102(1) of the dependent load instruction 306(0) (block 712). Accordingly, the memory dependence prediction circuit 124 may be referred to herein as "a means for determining whether the block reach set of the predictor table entry contains a block identifier corresponding to the instruction block of the dependent load instruction." If the block reach set 204(0) of the predictor table entry 200(0) contains a block identifier 208(0) corresponding to the instruction block 1024(1) of the dependent load instruction 306(0), processing of the detected memory dependence violation continues as usual (block 714). Otherwise, the memory dependence prediction circuit 124 adds a block identifier 208(0) corresponding to the instruction block 102(0) of the dependent load instruction 306(0) to the block reach set 204(0) of the predictor table entry 200(0) (block 716). The memory dependence prediction circuit 124 may thus be referred to herein as "a means for adding a block identifier corresponding to the instruction block of the dependent load instruction to the block reach set of the predictor table entry, responsive to determining that the block reach set of the predictor table entry does not contain a block identifier corresponding to the instruction block of the dependent load instruction." Processing of the detected memory dependence violation then continues as usual (block 714).

Figure 8:
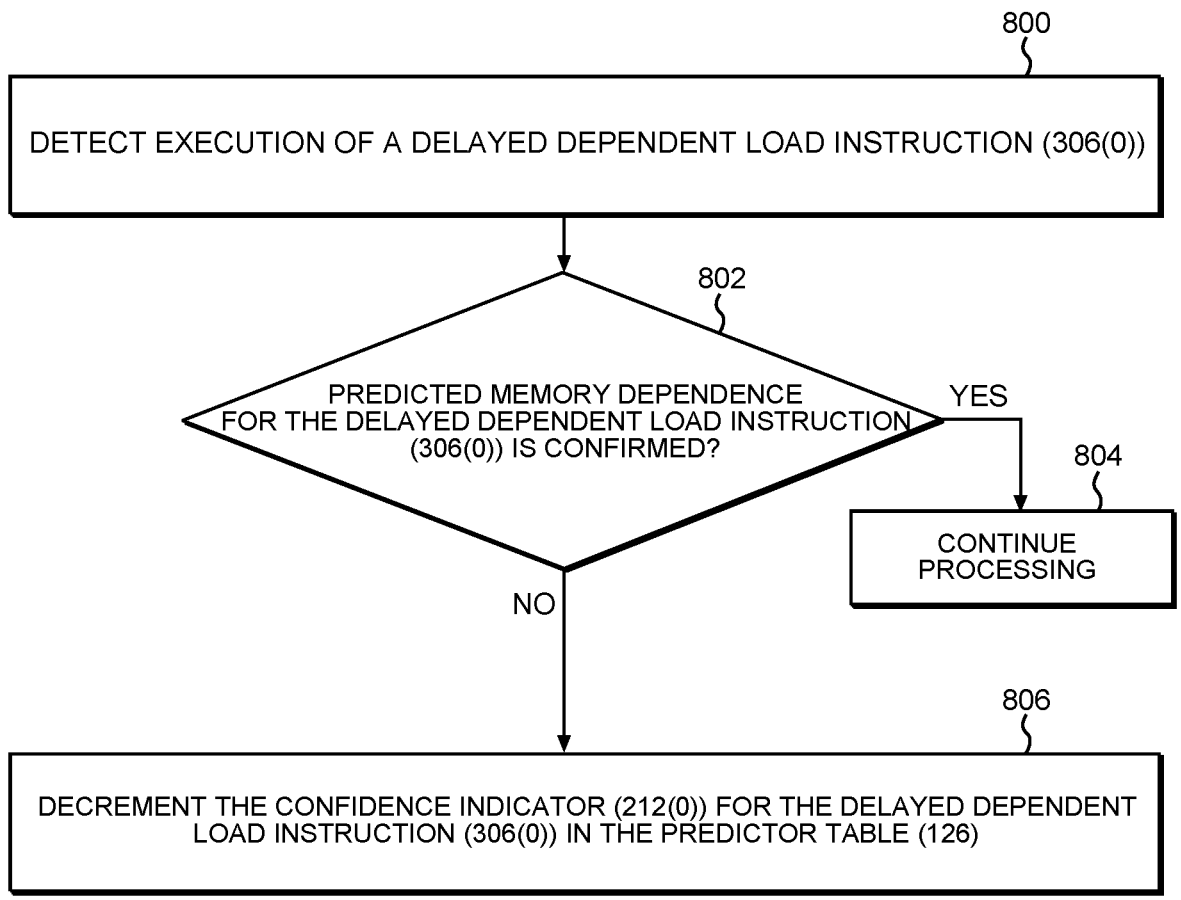
FIG. 8 is a flowchart illustrating exemplary operations for decrementing a confidence indicator for a dependent load instruction if a memory dependence of the dependent load instruction and a corresponding store instruction is not confirmed.

FIG. 8 is provided to illustrate exemplary operations for decrementing a confidence indicator 212(0) for a delayed dependent load instruction 306(0) if the memory dependence of the dependent load instruction 306(0) and the corresponding store instruction 302 is not confirmed. Elements of FIGS. 1, 2, 3A-3D, and 4A-4D are referenced in describing FIG. 8 for the sake of clarity. Operations in FIG. 8 begin with the memory dependence prediction circuit 124 detecting execution of a delayed dependent load instruction 306(0) (block 800). In this regard, the memory dependence prediction circuit 124 may be referred to herein as "a means for detecting execution of a delayed dependent load instruction." The memory dependence prediction circuit 124 determines whether a predicted memory dependence for the delayed dependent load instruction 306(0) is confirmed (block 802). Accordingly, the memory dependence prediction circuit 124 may be referred to herein as "a means for determining whether a predicted memory dependence for the delayed dependent load instruction is confirmed." If so, processing continues (block 804). However, if a predicted memory dependence for the delayed dependent load instruction 306(0) is not confirmed, the memory dependence prediction circuit 124 decrements the confidence indicator 212(0) for the delayed dependent load instruction 306(0) in the predictor table 126 (block 806). The memory dependence prediction circuit 124 may thus be referred to herein as "a means for decrementing the confidence indicator for the delayed dependent load instruction in the predictor table, responsive to determining that a predicted memory dependence for the delayed dependent load instruction is not confirmed."

Providing memory dependence prediction in block-atomic dataflow architectures according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

In this regard, FIG. 9 illustrates an example of a processor-based system 900 that can employ the memory dependence prediction circuit (MDPC) 124 illustrated in FIG. 1. In this example, the processor-based system 900 includes one or more central processing units (CPUs) 902, each including one or more processors 904. The one or more processors 904 may include the processor device 100 of FIG. 1, and may comprise the memory dependence prediction circuit (MDPC) 124 of FIG. 1. The CPU(s) 902 may be a master device. The CPU(s) 902 may have cache memory 906 coupled to the processor(s) 904 for rapid access to temporarily stored data. The CPU(s) 902 is coupled to a system bus 908 and can intercouple master and slave devices included in the processor-based system 900. As is well known, the CPU(s) 902 communicates with these other devices by exchanging address, control, and data information over the system bus 908. For example, the CPU(s) 902 can communicate bus transaction requests to a memory controller 910 as an example of a slave device.

Other master and slave devices can be connected to the system bus 908. As illustrated in FIG. 9, these devices can include a memory system 912, one or more input devices 914, one or more output devices 916, one or more network interface devices 918, and one or more display controllers 920, as examples. The input device(s) 914 can include any type of input device, including but not limited to input keys, switches, voice processors, etc. The output device(s) 916 can include any type of output device, including but not limited to audio, video, other visual indicators, etc. The network interface device(s) 918 can be any devices configured to allow exchange of data to and from a network 922. The network 922 can be any type of network, including but not limited to a wired or wireless network, a private or public network, a local area network (LAN), a wide local area network (WLAN), and the Internet. The network interface device(s) 918 can be configured to support any type of communications protocol desired. The memory system 912 can include one or more memory units 924(0)-924(Z).

The CPU(s) 902 may also be configured to access the display controller(s) 920 over the system bus 908 to control information sent to one or more displays 926. The display controller(s) 920 sends information to the display(s) 926 to be displayed via one or more video processors 928, which process the information to be displayed into a format suitable for the display(s) 926. The display(s) 926 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, Dynamic RAM (DRAM), Synchronous DRAM (SDRAM), a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sets other than the illustrated sets. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A processor-based device, based on a block-atomic dataflow architecture, comprising a hardware memory dependence prediction circuit, wherein the hardware memory dependence prediction circuit comprises: a predictor table configured to store a plurality of predictor table entries each comprising:
   a store instruction identifier corresponding to an instance of a store instruction;

a block reach set comprising a plurality of block identifiers corresponding to a plurality of instruction blocks each containing one or more dependent load instructions having a memory dependence on the instance of the store instruction; and a load set comprising a plurality of load instruction identifiers each corresponding to a dependent load instruction of the one or more dependent load instructions;

the hardware memory dependence prediction circuit configured to, upon a fetch of an instruction block by an execution pipeline of the processor-based device:

determine, based on one or more store instruction identifiers of the predictor table, whether the instruction block contains a respective one or more store instructions that reach one or more dependent load instructions; and responsive to determining that the instruction block contains the respective one or more store instructions that reach one or more dependent load instructions, mark the respective one or more store instructions as having one or more dependent load instructions to wake.

2. The processor-based device of claim 1, wherein the hardware memory dependence prediction circuit is further configured to:

determine, based on one or more block reach sets and one or more load sets of the predictor table, whether the instruction block contains a first one or more dependent load instructions reached by one or more store instructions corresponding to the one or more block reach sets and the one or more load sets; and responsive to determining that the instruction block contains the first one or more dependent load instructions reached by the one or more store instructions corresponding to the one or more block reach sets and the one or more load sets, delay execution of the first one or more dependent load instructions reached by the one or more store instructions corresponding to the one or more block reach sets and the one or more load sets upon execution of the instruction block.

3. The processor-based device of claim 2, wherein the hardware memory dependence prediction circuit is further configured to:

detect execution of a first store instruction;

determine whether the first store instruction is marked as having one or more dependent load instructions to wake; and responsive to determining that the first store instruction is marked as having one or more dependent load instructions to wake:

identify one or more delayed dependent load instructions of the first store instruction; and wake the one or more delayed dependent load instructions of the first store instruction for execution.

4. The processor-based device of claim 3, wherein the hardware memory dependence prediction circuit is configured to delay execution of the first one or more dependent load instructions reached by the one or more store instructions corresponding to the one or more block reach sets and the one or more load sets by being configured to:

generate, based on the predictor table, a load delay marker identifying the first one or more dependent load instructions reached by the one or more store instructions corresponding to the one or more block reach sets and the one or more load sets, responsive to determining that the instruction block contains the first one or more dependent load instructions reached by the one or more store instructions corresponding to the one or more block reach sets and the one or more load sets; and transfer, based on the load delay marker, the first one or more dependent load instructions reached by the one or more store instructions corresponding to the one or more block reach sets and the one or more load sets to a delay buffer.

5. The processor-based device of claim 4, wherein the hardware memory dependence prediction circuit is configured to wake the one or more delayed dependent load instructions of the first store instruction for execution by being configured to:

generate, based on the predictor table, a wakeup mask identifying the one or more delayed dependent load instructions to wake; and transfer, based on the wakeup mask, the one or more delayed dependent load instructions from the delay buffer to the execution pipeline of the processor processor-based device for execution.

6. The processor-based device of claim 2, wherein the hardware memory dependence prediction circuit is further configured to:

detect a first memory dependence violation resulting from execution of a first dependent load instruction prior to a corresponding first store instruction;

determine that the predictor table does not store a predictor table entry having a first store instruction identifier corresponding to the corresponding first store instruction; and responsive to determining that the predictor table does not store a predictor table entry having a first store instruction identifier corresponding to the corresponding first store instruction, generate a new predictor table entry containing a store instruction identifier corresponding to the corresponding first store instruction, a block reach set containing a block identifier corresponding to an instruction block of the first dependent load instruction, and a load set containing a load instruction identifier corresponding to the first dependent load instruction.

7. The processor-based device of claim 2, wherein the hardware memory dependence prediction circuit is further configured to:

detect a second memory dependence violation resulting from execution of a second dependent load instruction prior to a corresponding second store instruction;

determine that the predictor table stores a predictor table entry having a second store instruction identifier corresponding to the corresponding second store instruction; and responsive to determining that the predictor table stores the predictor table entry having the second store instruction identifier corresponding to the corresponding second store instruction:

determine whether a load instruction identifier corresponding to the second dependent load instruction is present in a load set of the predictor table entry;

responsive to determining that a load instruction identifier corresponding to the second dependent load instruction is not present in the load set of the predictor table entry:

add a load instruction identifier corresponding to the second dependent load instruction to the load set of the predictor table entry;

determine whether a block reach set of the predictor table entry contains a block identifier corresponding to an instruction block of the second dependent load instruction; and responsive to determining that the block reach set of the predictor table entry does not contain a block identifier corresponding to the instruction block of the second dependent load instruction, add a block identifier corresponding to the instruction block of the second dependent load instruction to the block reach set of the predictor table entry.

8. The processor-based device of claim 7, wherein:
the plurality of predictor table entries each further comprises a plurality of confidence indicators corresponding to the plurality of load instruction identifiers of the load set;
the hardware memory dependence prediction circuit is further configured to, responsive to determining that a load instruction identifier corresponding to the second dependent load instruction is present in the load set of the predictor table entry, increment a confidence indicator corresponding to the load instruction identifier corresponding to the second dependent load instruction; and
the hardware memory dependence prediction circuit is configured to delay execution of the first one or more dependent load instructions reached by the one or more store instructions further responsive to one or more confidence indicators respectively corresponding to one or more load instruction identifiers corresponding to the first one or more dependent load instructions exceeding a confidence threshold.

9. The processor-based device of claim 8, wherein the hardware memory dependence prediction circuit is further configured to:
detect execution of a delayed dependent load instruction;
determine whether a predicted memory dependence for the delayed dependent load instruction is confirmed; and
responsive to determining that a predicted memory dependence for the delayed dependent load instruction is not confirmed, decrement a confidence indicator for the delayed dependent load instruction in the predictor table.

10. The processor-based device of claim 1, wherein each store instruction identifier comprises one of the group consisting of:
a program counter (PC) of an instruction block containing the instance of the store instruction and an indication of a logical order of the store instruction within the instruction block containing the instance of the store instruction;
the PC of the instruction block containing the instance of the store instruction and an offset indicating a location of the store instruction relative to a start of the instruction block containing the instance of the store instruction; and
a memory address of the store instruction.

11. The processor-based device of claim 1, wherein each load instruction identifier of the plurality of load instruction identifiers comprises one of the group consisting of:
a PC of an instruction block containing a dependent load instruction corresponding to the load instruction identifier and an indication of a logical order of the dependent load instruction within the instruction block containing the dependent load instruction corresponding to the load instruction identifier;
the PC of the instruction block and an offset indicating a location of the dependent load instruction corresponding to the load instruction identifier relative to a start of the instruction block containing the dependent load instruction corresponding to the load instruction identifier; and
a memory address of the dependent load instruction corresponding to the load instruction identifier.

12. The processor-based device of claim 1 integrated into an integrated circuit (IC).

13. The processor-based device of claim 1, wherein the processor-based device is selected from the group consisting of: a set top box; a navigation device; a communications device; a fixed location data unit; a mobile location data unit; a global positioning system (GPS) device; a mobile phone; a cellular phone; a smart phone; a session initiation protocol (SIP) phone; a tablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

14. A method for providing memory dependence prediction, comprising:
detecting, by a memory dependence prediction circuit of a processor-based device based on a block-atomic dataflow architecture, a fetch of an instruction block by an execution pipeline of the processor-based device;
upon detecting the fetch of the instruction block, determining, based on one or more store instruction identifiers of a predictor table, whether the instruction block contains a respective one or more store instructions that reach one or more dependent load instructions;
responsive to determining that the instruction block contains the respective one or more store instructions that reach one or more dependent load instructions, marking the respective one or more store instructions as having one or more dependent load instructions to wake;
determining, based on one or more block reach sets and one or more load sets of the predictor table, whether the instruction block contains one or more dependent load instructions reached by one or more store instructions corresponding to the one or more block reach sets and the one or more load sets, wherein each block reach set comprises a plurality of block identifiers corresponding to a plurality of instruction blocks each containing one or more dependent load instructions, and each load set comprises a plurality of load instruction identifiers each corresponding to a dependent load instruction of the one or more dependent load instructions reached by the one or more store instructions corresponding to the one or more block reach sets and the one or more load sets; and
responsive to determining that the instruction block contains the one or more dependent load instructions reached by the one or more store instructions corresponding to the one or more block reach sets and the one or more load sets, delaying execution of the one or more dependent load instructions reached by the one or more store instructions corresponding to the one or more block reach sets and the one or more load sets upon execution of the instruction block.

15. The method of claim 14, further comprising:
detecting execution of a store instruction;

determining whether the store instruction is marked as having one or more dependent load instructions to wake; and responsive to determining that the store instruction is marked as having one or more dependent load instructions to wake:

identifying one or more delayed dependent load instructions of the store instruction; and waking the one or more delayed dependent load instructions of the store instruction for execution.

16. The method of claim 15, wherein delaying execution of the one or more dependent load instructions reached by the one or more store instructions corresponding to the one or more block reach sets and the one or more load sets comprises:

generating, based on the one or more block reach sets and the one or more load sets of the predictor table, a load delay marker identifying the one or more dependent load instructions reached by the one or more store instructions corresponding to the one or more block reach sets and the one or more load sets, responsive to determining that the instruction block contains the one or more dependent load instructions reached by the one or more store instructions corresponding to the one or more block reach sets and the one or more load sets; and transferring, based on the load delay marker, the one or more dependent load instructions reached by the one or more store instructions corresponding to the one or more block reach sets and the one or more load sets to a delay buffer.

17. The method of claim 16, wherein waking the one or more delayed dependent load instructions of the store instruction for execution comprises:

generating, based on the one or more block reach sets and the one or more load sets of the predictor table, a wakeup mask identifying the one or more delayed dependent load instructions to wake; and transferring, based on the wakeup mask, the one or more delayed dependent load instructions from the delay buffer to the execution pipeline of the processor-based device for execution.

18. The method of claim 14, further comprising:

detecting a first memory dependence violation resulting from execution of a first dependent load instruction prior to a corresponding first store instruction;

determining that the predictor table does not store a predictor table entry having a first store instruction identifier corresponding to the corresponding first store instruction; and responsive to determining that the predictor table does not store a predictor table entry having a first store instruction identifier corresponding to the corresponding first store instruction, generating a new predictor table entry containing a store instruction identifier corresponding to the corresponding first store instruction, a block reach set containing a block identifier corresponding to an instruction block of the first dependent load instruction, and a load set containing a load instruction identifier corresponding to the first dependent load instruction.

19. The method of claim 14, further comprising:

detecting a second memory dependence violation resulting from execution of a second dependent load instruction prior to a corresponding second store instruction;

determining that the predictor table stores a predictor table entry having a second store instruction identifier corresponding to the corresponding second store instruction; and responsive to determining that the predictor table stores the predictor table entry having the second store instruction identifier corresponding to the corresponding second store instruction:

determining whether a load instruction identifier corresponding to the second dependent load instruction is present in a load set of the predictor table entry;

responsive to determining that a load instruction identifier corresponding to the second dependent load instruction is not present in the load set of the predictor table entry:

adding a load instruction identifier corresponding to the second dependent load instruction to the load set of the predictor table entry;

determining whether a block reach set of the predictor table entry contains a block identifier corresponding to an instruction block of the second dependent load instruction; and responsive to determining that the block reach set of the predictor table entry does not contain a block identifier corresponding to the instruction block of the second dependent load instruction, adding a block identifier corresponding to the instruction block of the second dependent load instruction to the block reach set of the predictor table entry.

20. The method of claim 19, wherein:

the predictor table further comprises a plurality of confidence indicators corresponding to the plurality of load instruction identifiers of the load set;

the method further comprises, responsive to determining that a load instruction identifier corresponding to the second dependent load instruction is present in the load set of the predictor table entry, incrementing a confidence indicator corresponding to the load instruction identifier corresponding to the second dependent load instruction; and delaying execution of the one or more dependent load instructions reached by the one or more store instructions corresponding to the one or more block reach sets and the one or more load sets is further responsive to one or more confidence indicators respectively corresponding to one or more load instruction identifiers corresponding to the one or more dependent load instructions reached by the one or more store instructions corresponding to the one or more block reach sets and the one or more load sets exceeding a confidence threshold.

21. The method of claim 20, further comprising:

detecting execution of a delayed dependent load instruction;

determining whether a predicted memory dependence for the delayed dependent load instruction is confirmed; and responsive to determining that a predicted memory dependence for the delayed dependent load instruction is not confirmed, decrementing a confidence indicator for the delayed dependent load instruction in the predictor table.

22. The method of claim 14, wherein each store instruction identifier of the one or more store instruction identifiers comprises one of the group consisting of:

a program counter (PC) of an instruction block containing an instance of a corresponding store instruction and an indication of a logical order of the store instruction within the instruction block containing the instance of the corresponding store instruction;

the PC of the instruction block containing the instance of the corresponding store instruction and an offset indicating a location of the store instruction relative to a start of the instruction block containing the instance of the corresponding store instruction; and a memory address of the store instruction.

23. The method of claim 14, wherein each load instruction identifier of the plurality of load instruction identifiers comprises one of the group consisting of:

a PC of an instruction block containing a dependent load instruction corresponding to the load instruction identifier and an indication of a logical order of the dependent load instruction within the instruction block containing the dependent load instruction corresponding to the load instruction identifier;

the PC of the instruction block and an offset indicating a location of the dependent load instruction corresponding to the load instruction identifier relative to a start of the instruction block containing the dependent load instruction corresponding to the load instruction identifier; and a memory address of the dependent load instruction corresponding to the load instruction identifier.

* * * * *